United States Patent
Hatanaka et al.

(10) Patent No.: US 6,957,129 B2
(45) Date of Patent: Oct. 18, 2005

(54) CONTROL UNIT FOR MOTOR-ASSISTED BICYCLE

(75) Inventors: Kaoru Hatanaka, Saitama (JP); Shinji Furuta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/084,140

(22) Filed: Feb. 28, 2002

(65) Prior Publication Data

US 2002/0120382 A1 Aug. 29, 2002

(30) Foreign Application Priority Data

| Feb. 28, 2001 | (JP) | ..................................... | 2001-055399 |
| Feb. 28, 2001 | (JP) | ..................................... | 2001-055400 |
| Feb. 28, 2001 | (JP) | ..................................... | 2001-055401 |
| Feb. 28, 2001 | (JP) | ..................................... | 2001-055402 |

(51) Int. Cl.$^7$ .......................... G06F 19/00; B62M 23/02
(52) U.S. Cl. .............................. 701/1; 701/22; 280/210
(58) Field of Search ............................... 701/1, 70, 22; 180/205, 206, 207, 220; 280/210

(56) References Cited

U.S. PATENT DOCUMENTS

| 4,637,274 | A | * | 1/1987 | Goldenfeld | .................. | 74/625 |
| 5,664,636 | A | * | 9/1997 | Ikuma et al. | ............... | 180/206 |
| 5,819,867 | A | * | 10/1998 | Matsumoto et al. | ......... | 180/206 |
| 5,922,035 | A | | 7/1999 | Chen | | |
| 5,924,511 | A | * | 7/1999 | Takata | ........................ | 180/205 |
| 5,992,553 | A | * | 11/1999 | Morrison | ................... | 180/206 |
| 6,003,627 | A | * | 12/1999 | Ishida | ........................ | 180/206 |
| 6,015,021 | A | * | 1/2000 | Tanaka et al. | .............. | 180/206 |
| 6,247,548 | B1 | * | 6/2001 | Hayashi et al. | ............. | 180/206 |
| 6,320,336 | B1 | * | 11/2001 | Eguchi | ....................... | 318/139 |
| 6,439,065 | B1 | * | 8/2002 | Ooshima et al. | ........ | 73/862.326 |

FOREIGN PATENT DOCUMENTS

| DE | 43 02 838 A1 | 8/1994 |
| EP | 0 697 333 A1 | 2/1996 |
| EP | 0 786 399 A2 | 9/1997 |
| EP | 0 798 204 A1 | 10/1997 |
| EP | 0 926 059 A3 | 6/1999 |
| EP | 0 926 059 A2 | 6/1999 |
| EP | 0 994 015 A3 | 4/2000 |
| EP | 0 994 015 A2 | 4/2000 |
| JP | 8-127386 | 5/1996 |
| JP | 2000-27985 A | 1/2000 |

OTHER PUBLICATIONS

Abstract of EP 0 786 399 A3

* cited by examiner

Primary Examiner—Michael J. Zanelli
(74) Attorney, Agent, or Firm—Birch, Stewart, Kolasch & Birch, LLP

(57) ABSTRACT

A control unit for a motor-assisted vehicle such as a bicycle is disclosed that effectively provides an assist drive power to a motor-assisted bicycle during a period of initial pedaling or startup on an upward slope or at the time of acceleration. A first detection signal is outputted when a vehicle speed is equal to or less than a predetermined vehicle speed. A second detection signal is outputted when acceleration is equal to or more than a predetermined value on the basis of a change in the amount of the vehicle speed. A road surface inclination is determined from a map on the basis of a ratio between an actual running resistance and a flat road running resistance. A coefficient K is retrieved form the map corresponding to either the first detection signal or the second detection signal to increase the assist power from the map on the basis of the vehicle speed. The coefficient K is inputted into an assist power calculating portion, and the required assist drive power is calculated.

21 Claims, 17 Drawing Sheets

CONTROL UNIT FOR MOTOR-ASSISTED BICYCLE

CROSS-REFERENCES TO RELATED APPLICATIONS

This nonprovisional application claims priority under 35 U.S.C. § 119(a) on Patent Application No. 2001-055399 filed in Japan on Feb. 28, 2001; Patent Application No. 2001-055400 filed in Japan on Feb. 28, 2001; Patent Application No. 2001-055401 filed in Japan on Feb. 28, 2001; and Patent Application No. 2001-055402 filed in Japan on Feb. 28, 2001, the entirety of each of which is herein incorporated by reference.

BACKGROUND OF THE INVENTION

1. Field of the Invention

The present invention relates to a control unit for a motor-assisted bicycle, and more particularly to a control unit for driving a motor-assisted bicycle with the same running sensation as that obtained by a bicycle without a motor-assisted unit (hereinafter, referred to as "ordinary bicycle").

2. Description of the Background Art

A motor-assisted bicycle of a type including a manually powered drive system for transmitting a force applied to pedals by manual power, e.g. a rear wheel is powered by a driving force from an operator's legs and a motor drive system for adding an assist power to the manually-powered drive system in accordance with the driving force exerted by the operator's legs. This type of motor-assisted bicycle is configured to assist manual power with a motor output in accordance with both a leg-power and a pedal rotational speed. As the leg-power increases, the motor output increases to reduce the necessary manual power and the operator's exerted energy. Accordingly, the motor output is proportional to the leg (manual) power.

A motor output for a motor-assisted bicycle has also been considered in the background art that attempts to compensate for the weight of the bicycle and to reduce power consumption, e.g. during periods when an operator may be walking the bicycle. For example, a motor-assisted bicycle has been proposed in Japanese Patent Laid-open No. Hei 8-127386, wherein a difference in weight between the motor-assisted bicycle and an ordinary bicycle is offset/assisted by a motor to reduce the required manual power when a driver walks the bicycle.

As described above, in the motor-assisted bicycles of the background art, since a motor output is proportional to the manual power, e.g. leg-power, an assist power is provided so as to amplify a periodical change in leg-power occurring in accordance with the rotation of the bicycle pedals. Accordingly, although man-power can be reduced, the vehicle speed tends vary periodically.

The above-described peripheral variation in vehicle speed does not occur where a difference in weight between the motor-assisted bicycle and an ordinary bicycle is canceled by an assisted power irrespective of the manual power. However, the motor-assisted bicycles of this type are intended to provide an assist power irrespective of the manual power only at the time when an operator walks the vehicle. Therefore, the motor-assisted bicycles of the background art do not provide an assist power irrespective of the manual power during operation of the vehicle.

Further, the motor-assisted bicycles of the background art further require another assist control means such an inclination sensor in situations where the bicycle is operated on inclined surfaces such as steep roads. The latter-described motor-assisted bicycle of the background art may often fail to suitably generate an assist power, since an assist power is corrected only on the basis of the degree of inclination of a road surface on which a driver walks the vehicle.

SUMMARY OF THE INVENTION

The present invention overcomes the shortcomings associated with the background art and achieves other advantages not realized by the background art.

An object of the present invention is to provide a control unit for a motor-assisted vehicle allowing the vehicle to be driven with the same running sensation as that obtained by an ordinary bicycle even when running on an inclined road surface and/or a flat road.

An object of the present invention is to provide a control unit for a motor assisted vehicle that permits operation without amplifying a peripheral variation in manual power.

An additional object of the present invention is to provide a control unit for a motor assisted vehicle that permits the adjustment of an assist power in accordance with any one of various operational states of the vehicle.

These and other objects are accomplished by a control unit for a motor-assisted vehicle including a manual powered drive system for transmitting a manual drive force to a rear wheel and a motor drive system for transmitting a motor drive force by a motor to the rear wheel, the control unit comprising means for detecting an actual running resistance of a vehicle; and means for controlling and generating an assist drive force corresponding to the actual running resistance of the motor drive system.

These and other objects are further accomplished by a control unit for a motor-assisted vehicle including a manual powered drive system for transmitting a manual drive force to a rear wheel and a motor drive system for transmitting a motor drive force by a motor to the rear wheel, the control unit comprising means for detecting an actual running resistance of a vehicle; means for generating an assist drive force corresponding to the actual running resistance; and means for calculating and detecting an acceleration of the vehicle; wherein the means for generating the assist drive power increases the assist drive force generated by the motor drive system in accordance with the acceleration after a predetermined value of time.

These and other objects are further accomplished by a control unit for a motor-assisted vehicle including a manual powered drive system for transmitting a manual drive force to a rear wheel and a motor drive system for transmitting a motor drive force by a motor to the rear wheel, the control unit comprising means for detecting an actual running resistance of a vehicle; and means for controlling and generating an assist drive force corresponding to the actual running resistance of the motor drive system; and means for deciding an operational state of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 2:
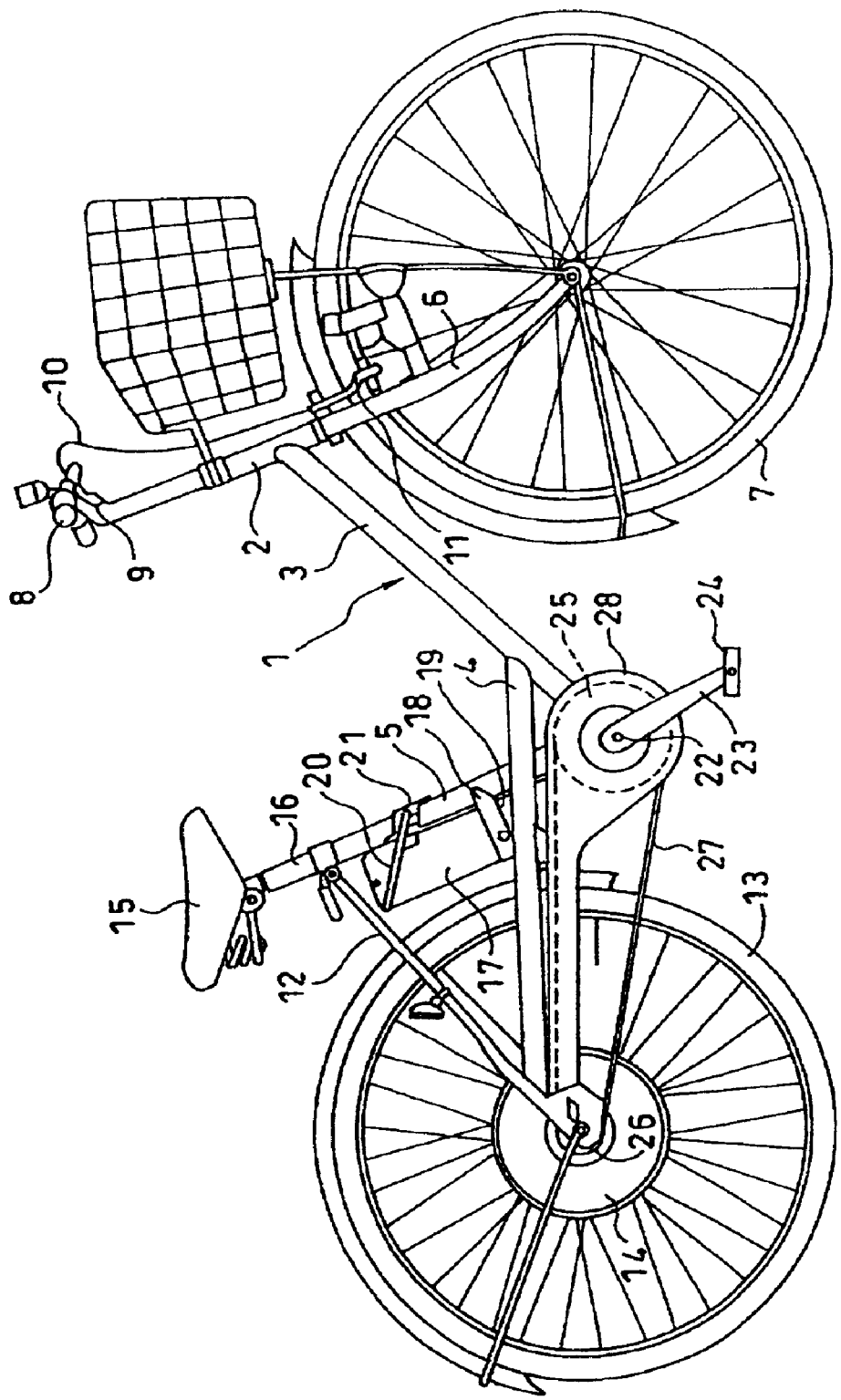
FIG. 2 is a side view of a motor-assisted bicycle having the control unit according to an embodiment of the present invention.

The present invention will hereinafter be described with reference to the accompanying drawings. FIG. 2 is a side view of a motor-assisted bicycle having the control unit according to an embodiment of the present invention. A body frame 1 of the motor-assisted bicycle includes a head pipe 2 positioned on a front side of a vehicular body, a down pipe 3 extending rearwardly and downwardly from the head pipe 2, a rear fork 4 connected to the down pipe 3 and extending rearwardly therefrom, and a seat post 5 raised from a lowermost end of the down pipe 3.

A front fork 6 is rotatably supported by the head pipe 2. A front wheel 7 is rotatably supported by lower ends of the front fork 6. A steering handlebar 8 is mounted on an upper end of the front fork 6. A brake lever 9 is provided on the steering handlebar 8. A cable 10 extending from the brake lever 9 is connected to a front wheel brake 11 fixed to the front fork 6. Similarly, while not shown, a brake lever extending to a rear wheel brake is provided on the steering handlebar 8. A brake sensor (not shown) for sensing operation of the brake lever 9 is provided on the brake lever 9.

A pair of right and left stays 12 connected to an upper end of the seat post 5 extend rearwardly and downwardly, and are joined to portions near lower ends of the rear fork 4. A rear wheel 13 is supported by the joint member formed of the rear fork 4 and the stays 12. A motor 14 providing an assist power source is also supported by the joint member in such a manner as to be coaxial with a hub of the rear wheel 13. The motor 14 is preferably configured as a three-phase brushless motor having a high torque and low friction. A more detailed description of the structure and a control manner of the motor 14 will be provided hereinafter.

A supporting shaft 16, which has at its upper end a seat 15, is inserted in the seat post 5 in a state permitting adjustment of a height of the seat 15. A battery 17 for supplying power to the motor 14 is provided under the seat 15 at a position between the seat post 5 and the rear wheel 13. The battery 17 is supported by a bracket 18 fixed to the seat post 5. A power feed portion 19 is provided on the bracket 18. The power feed portion 19 is connected to the motor 14 via an electric wire (not shown) and is also connected to an electrode of the battery 17. An upper portion of the battery 17 is supported by the seat post 5 via a clamping device, e.g. formed of a band 20 and a buckle 21 in a preferred embodiment.

A crankshaft 22 extending in the width direction of the vehicular body is supported by a crossing portion between the down pipe 3 and the seat post 5. Pedals 24 are connected to the crankshaft 22 via cranks 23. A drive sprocket 25 is connected to the crankshaft 22 via a leg-power sensor (not shown). A leg-power applied to the pedals 24 is transmitted to the drive sprocket 25 via the leg-power sensor.

A chain 27 is wound around the drive sprocket 25 and a driven sprocket 26 provided on the hub of the rear wheel 13. A stretching side of the chain 27 and the drive sprocket 25 are covered with a chain cover 28. A rotation sensor (not shown) for detecting rotation of the crankshaft 22 is provided on the crankshaft 22. A rotation sensor such as a sensor type used for detecting rotation of a crankshaft of an engine for an automobile may be used in the preferred embodiment.

Figure 20:
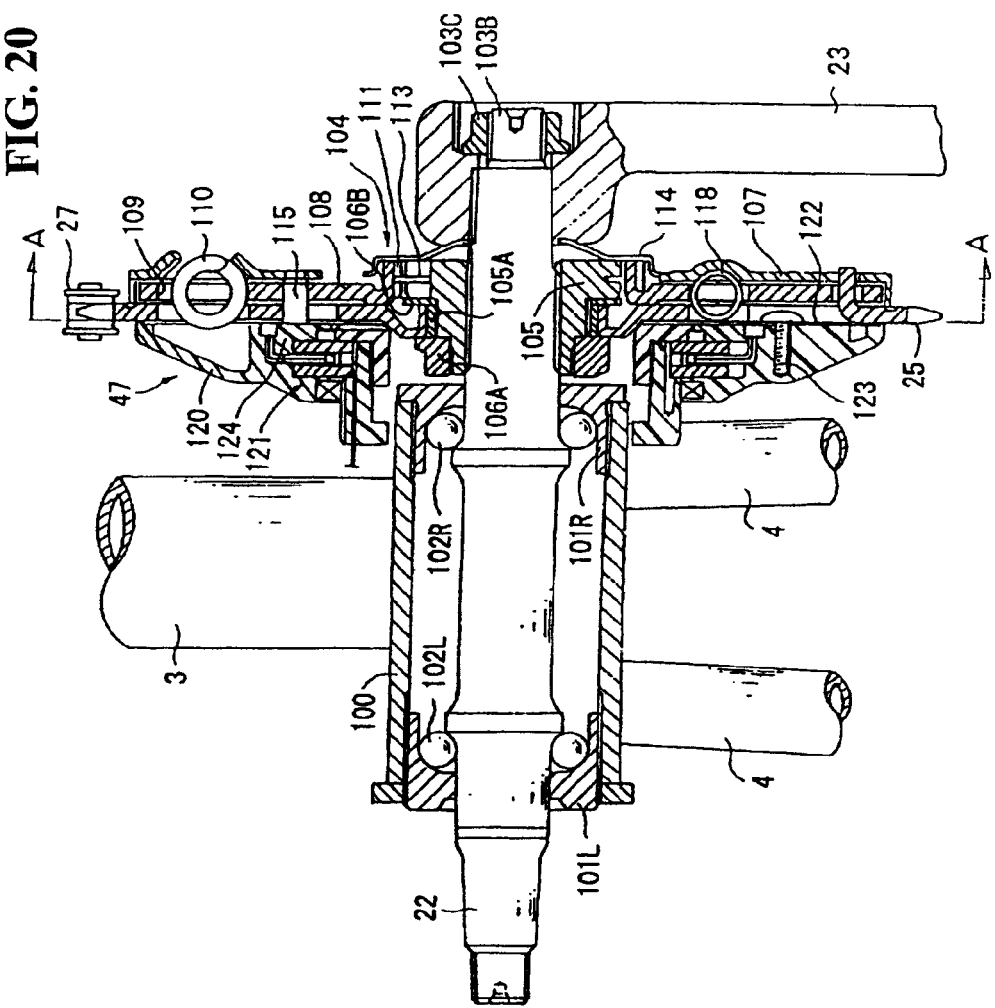
FIG. 20 is a sectional view of a portion of a manual powered drive unit in which a leg-power detecting unit is assembled.
Figure 21:
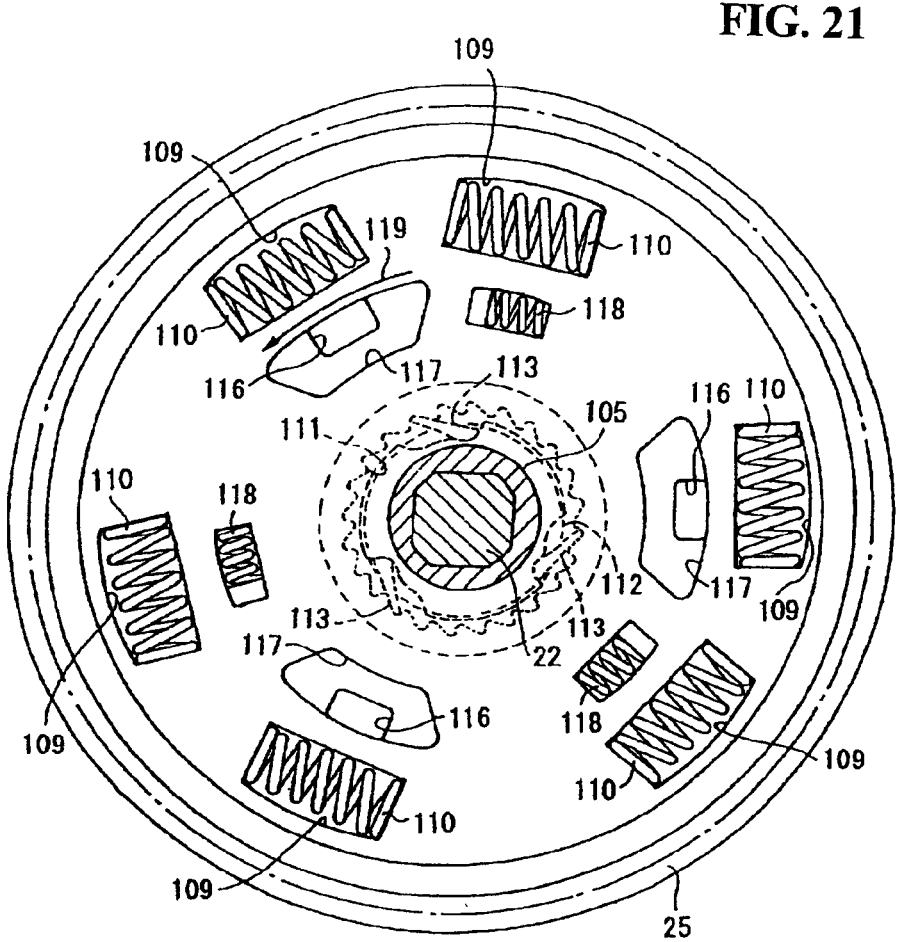
FIG. 21 is a sectional view taken along line A—A of FIG. 20.

A leg-power detecting unit mounted to the crankshaft 22 will be described hereinafter. FIG. 20 is a sectional view of a portion of a manual powered drive unit in which a leg-power detecting unit is assembled. FIG. 21 is a sectional view taken along line A—A of FIG. 20. Caps 101L and 101R are screwed in both ends of a supporting pipe 100 fixed to the down pipe 3. Ball bearing 102L and 102R are inserted between the caps 101L and 101R and difference-in-diameter portions formed on the crankshaft 22, respectively, to thereby rotatably support the crankshaft 22.

The cranks 23 are fixed to left and right ends of the crankshaft 22 by nuts 103C screwed around bolts 103B (only the right side is shown in FIG. 20). An inner ring 105 of a one-way clutch 104 is fixed between the right side crank 23 and the supporting pipe 100. The drive sprocket 25 is rotatably supported on an outer periphery of the inner ring 105 via a bush 105A. A position of the drive sprocket 25 in the thrust direction is restricted by a nut 106A and a plate 106B.

A lid 107 is integrally provided on the drive sprocket 25, and a transmission plate 108 is disposed in a space surrounded by the drive sprocket 25 and the lid 107. The transmission plate 108 is supported coaxially with the drive sprocket 25 in such a manner that a predetermined offset between the transmission plate 108 and the drive sprocket 25 is permitted in the rotational direction around the crankshaft 22.

A plurality (six pieces in this embodiment) of windows 109 are formed in both the drive sprocket 25 and the transmission plate 108. A compression coil spring 110 is provided in each window 109. When an offset between the drive sprocket 25 and the transmission plate 108 in the rotational direction occurs, the compression coil springs 110 act to generate a reaction force against the offset therebetween.

Ratchet teeth 111 functioning as an outer ring of the one-way clutch 104 are formed on an inner periphery of a hub of the transmission plate 108. Meanwhile, ratchet claws 113 are supported by the inner ring 105 of the one-way clutch 104 in such a manner as to be radially biased by a spring 112. The ratchet teeth 111 are engaged with the ratchet claws 113. The one-way clutch 104 is provided with a dust-proof cover 114.

A locking hole 116 is provided in the transmission plate 108. A projecting portion 115 for transmission of a leg-power, which is fixed to a leg-power transmission ring 124, is engaged in the locking hole 116. A window 117 for allowing the projecting portion 115 to be locked in the locking hole 116 is provided in the drive sprocket 25. The projecting portion 115 passes through the window 117 to be fitted in the locking hole 116.

A plurality (three pieces in this embodiment) of small windows, differing from the aforementioned windows 109, are formed in both the drive sprocket 25 and the transmission plate 108. A compression coil spring 118 is provided in each small window. The compression coil springs 118 are disposed in such a manner as to bias the transmission plate 108 in the rotational direction 119, e.g., in the direction of eliminating a looseness of a connection portion between the drive sprocket 25 and the transmission plate 108. Specifically, the compression coil springs 118 allow the responsive transmission of a displacement of the transmission plate 108 to the drive sprocket 25.

A sensor portion (leg-power sensor) 47 of the leg-power detecting unit is mounted on a portion, on the vehicular body or down-pipe 3 side, of the drive sprocket 25. The leg-power sensor 47 has an outer ring 120 fixed to the drive sprocket 25, and a sensor main body 121 rotatably provided on the outer ring 120 for forming a magnetic circuit. The outer ring 120 is made from an electrical insulating material, and is fixed to the drive sprocket 25 with a bolt (not shown). A cover 122 is provided on a portion, e.g. on the drive sprocket 25 side, of the outer ring 120. The cover 122 is fixed to the outer ring 120 with a set screw 123.

Figure 22:
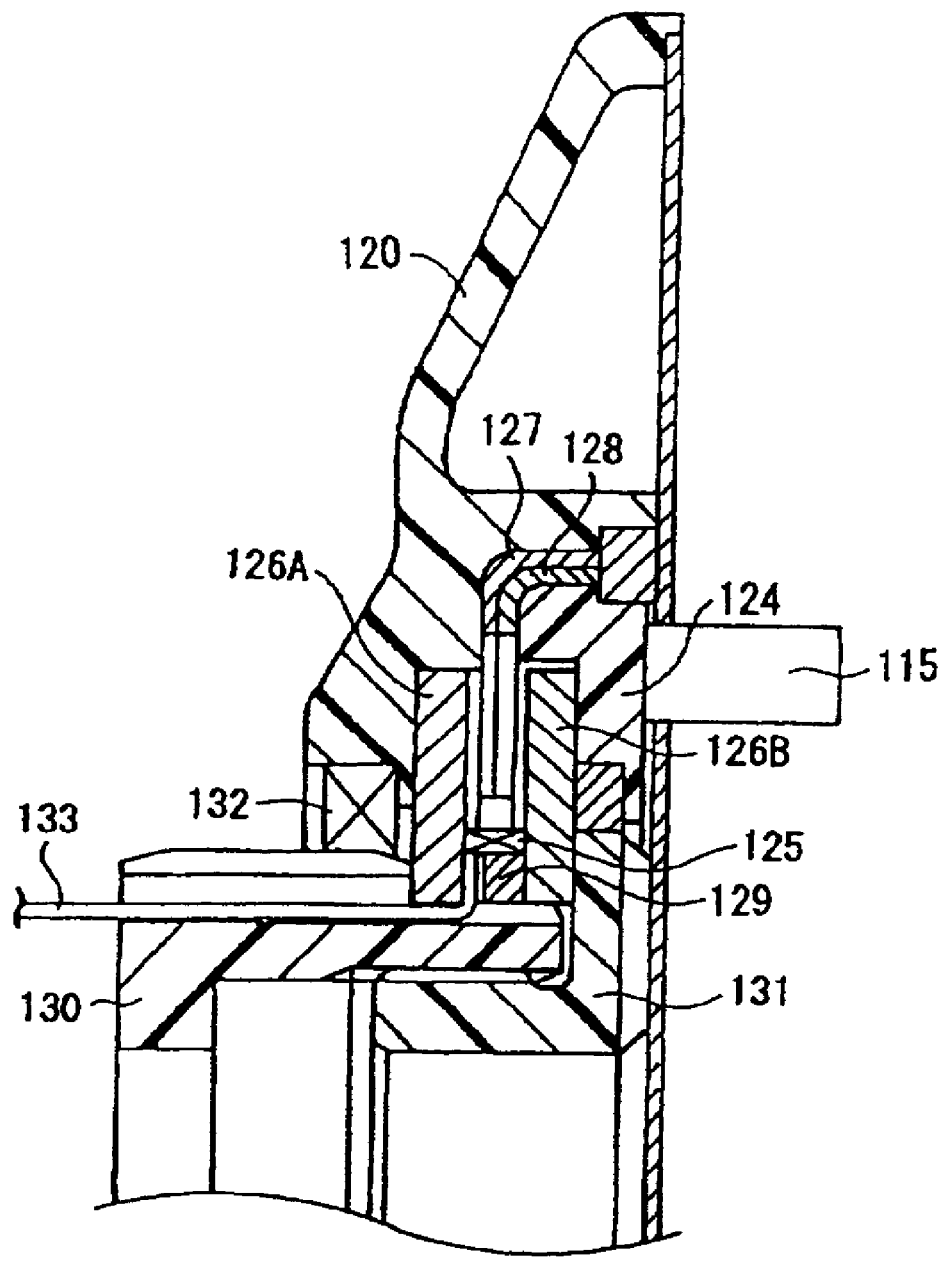
FIG. 22 is an enlarged sectional view of the leg-power detecting unit according to an embodiment of the present invention.

FIG. 22 is an enlarged sectional view of the leg-power detecting unit according to an embodiment of the present invention. FIG. 22 is an enlarged sectional view of the sensor main body 121. A coil 125 is provided concentrically with the crankshaft 22, and a pair of cores 126A and 126B are provided on both sides of the coil 125 in the axial direction in such a manner as to project in the outer peripheral direction of the coil 125. The leg-power detecting unit also includes supporting members 130, 131 of the sensor main body 121, a bearing 132, and a lead wire 133 extending from the coil 125. A first inductor 127 and a second inductor 128, each of which is formed in an annular shape, are provided between the cores 126A and 126B.

The first inductor 127 and the second inductor 128 can be displaced in the circumferential direction depending on a leg-power transmitted from the leg-power transmission ring 124. An overlapped amount of the first and second inductors 127 and 128 between the cores 126A and 126B is changed by the displacements of the first and second inductors 127 and 128. As a result, when a current is applied to the coil 125, a magnetic flux flowing in a magnetic circuit formed by the cores 126A and 126B, a core collar 129, and the first and second inductors 127 and 128, is changed depending the applied leg-power. Accordingly, an applied leg-power can be detected by measuring a change in inductance of the coil 125, which is a function of the magnetic flux.

The above-described leg-power detecting unit has been fully described in the specification of the earlier application filed by the present applicant (Japanese Patent Application No. Hei 11-251870 (Reference No. A99-1026)), the entirety of which is hereby incorporated by reference. However, the leg-power detecting unit is not limited to that described above but may be suitably selected from other types commonly available in the related art.

Figure 3:
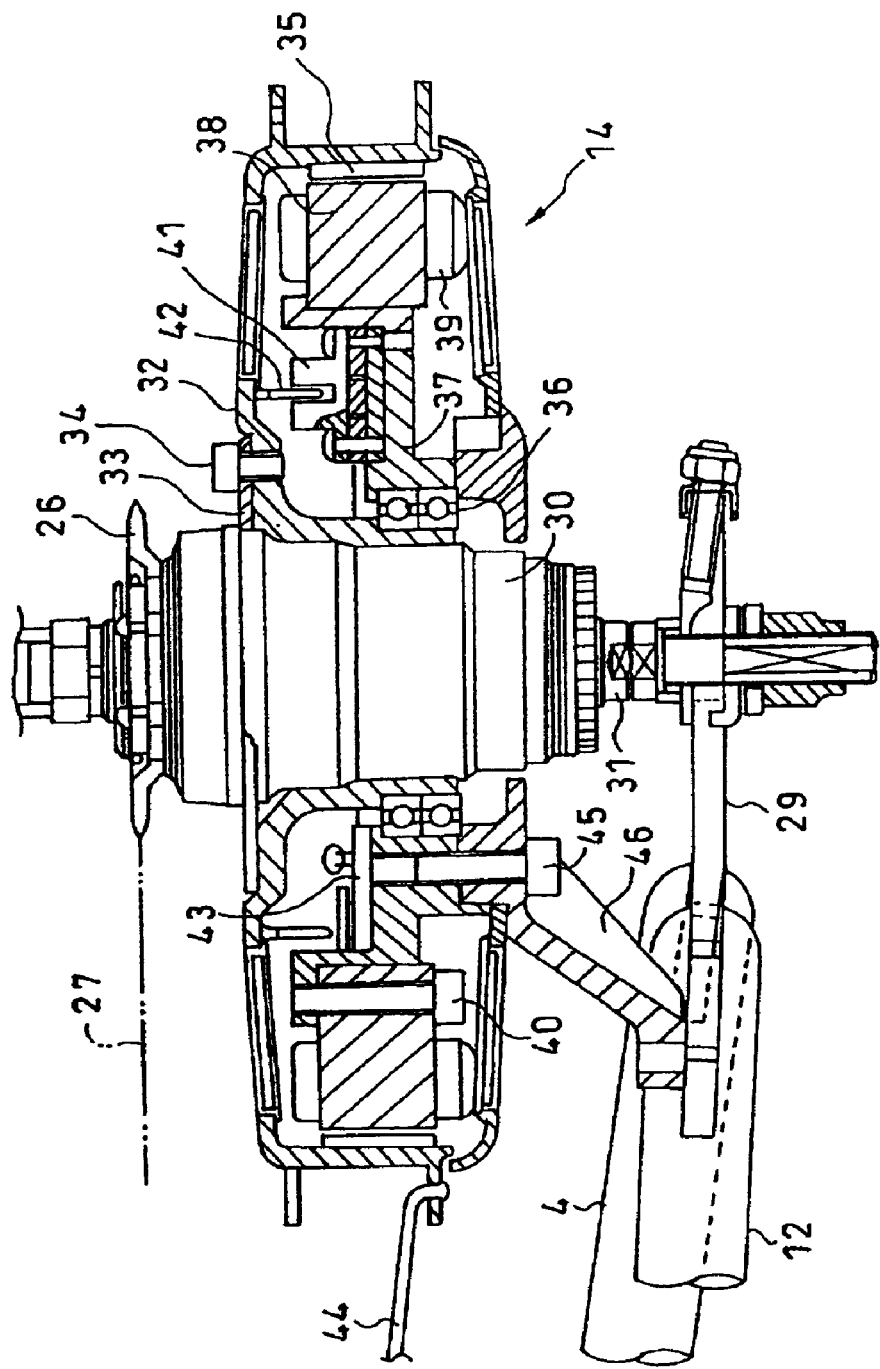
FIG. 3 is a sectional view of a motor according to an embodiment of the present invention.

FIG. 3 is a sectional view of the motor 14 according to an embodiment of the present invention. A plate 29 projects rearwardly from the joint member formed by the rear ends of the rear fork 4 and the lower ends of the stays 12. A cylinder 30 in which a speed change gear is assembled is supported by the plate 29 via a shaft 31. A wheel hub 32 is fitted around an outer periphery of the cylinder 30. The wheel hub 32 is formed into an annular body having an inner cylinder and an outer cylinder.

An inner peripheral surface of the inner cylinder is brought into contact with the outer periphery of the cylinder 30. A connection plate 33 projecting from the cylinder 30 is fixed to a side surface of the wheel hub 32 with a bolt 34. Neodymium magnets 35 forming rotor side magnetic poles of the motor 14 are disposed on an inner periphery of the outer cylinder of the wheel hub 32 in such a manner as to be spaced from each other at specific intervals. The outer cylinder of the wheel hub 32 forms a rotor core holding the magnets 35.

A bearing 36 is fitted on an outer periphery of the inner cylinder of the wheel hub 32, and a stator supporting plate 37 is fitted on an outer periphery of the bearing 36. A stator 38 is disposed on an outer periphery of the stator supporting plate 37 and is mounted thereto with a bolt 40. The stator 38 is disposed with a specific fine gap between the rotor core, e.g., the outer cylinder of the wheel hub 32 and the stator 38. A three-phase coil 39 is wound around the stator 38.

Magnetic pole sensors 41 composed of Hall elements are provided on a side surface of the stator supporting plate 37. The magnetic pole sensor 41 senses a change in magnetic flux at the time when a magnet 42 projecting from the wheel hub 32 passes through the magnetic pole sensor 41, and outputs a signal indicating a position of the wheel hub 32. The magnetic pole sensors 41 are located at three positions in accordance with three-phases of the motor 14 in a preferred embodiment.

A control board 43 is provided on a side surface of the stator supporting plate 37. The control board 43 is adapted to control supply of a current to the three-phase coil 39 on the basis of position signals from the magnetic pole sensors 41. Control elements such as a CPU and FETs are mounted on the control board 43. It is to be noted that the control board 43 can be integrated with a board for mounting the magnetic pole sensors 41.

Spokes 44 to be connected to a rim of the rear wheel (not shown) are fixed to an outer periphery of the wheel hub 32. A bracket 46 is fixed to a side surface of the stator supporting plate 37 with a bolt 45, preferably on a side surface opposed to the side surface on which the control board 43 and the like are mounted. The bracket 46 is connected to the plate 29 of the body frame with a bolt (not shown).

The three-phase brushless motor 14 thus includes the stator and the rotor that are provided coaxially with the shaft 31 of the rear wheel 13. The motor 14 generates an assist power added to a manual-power transmitted via the chain 17 and the driven sprocket 26.

Figure 4:
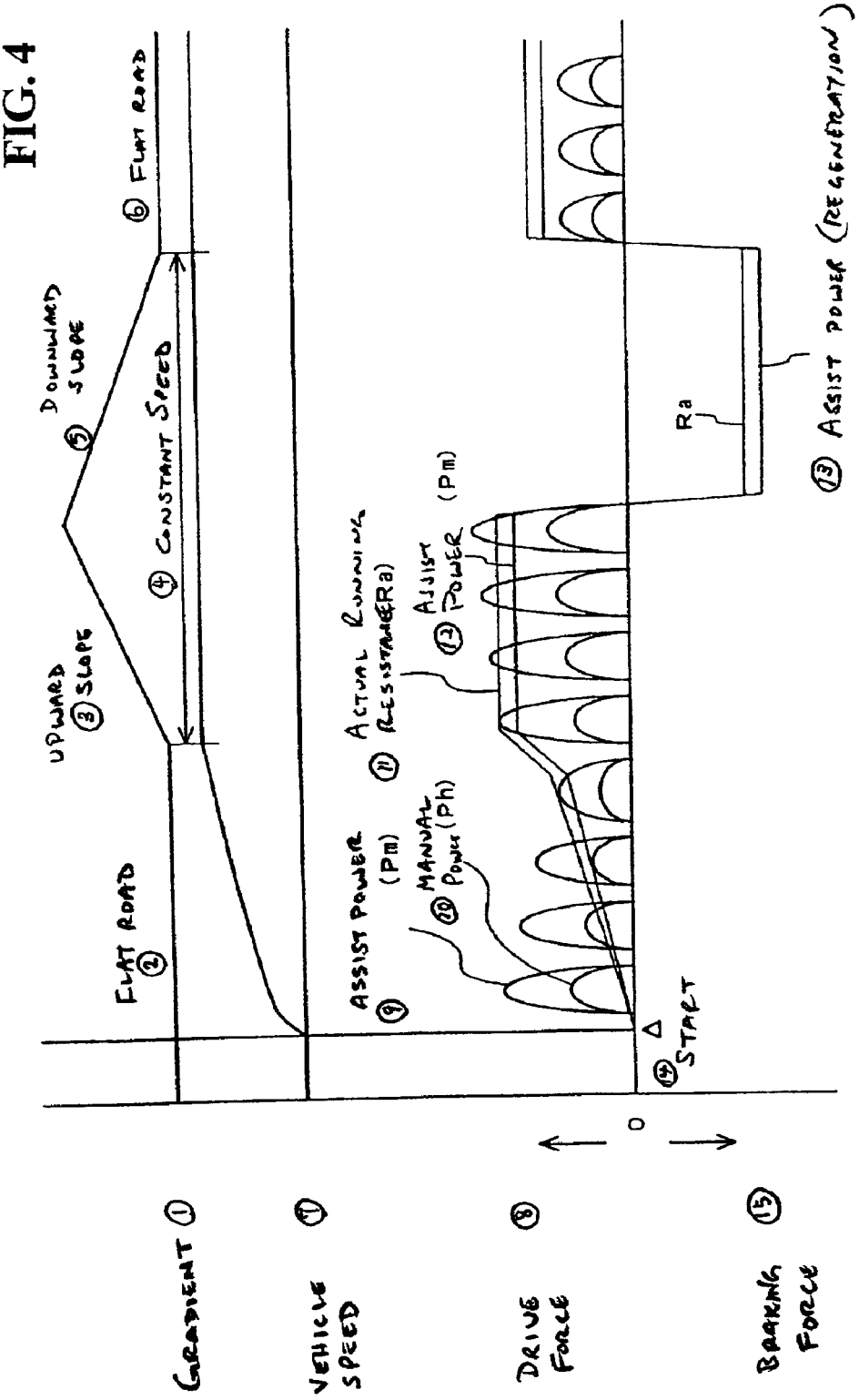
FIG. 4 is a graphical view showing a relationship between a change in road surface state and a change in drive force.

The control of a supply of current to the motor 14, e.g. the control of an output of the motor 14 will be described hereinafter. FIG. 4 is a graphical view showing a relationship between a change in road surface state and a change in drive force. FIG. 4 shows a generation state of an assist power on an assumed running road. In this figure, the abscissa designates time. It is assumed that a vehicle runs on a running road having a flat road, an upward slope, a downward slope, and a flat road. A running pattern of the vehicle on the assumed running road is set such that the vehicle gradually accelerates on the flat road, and after reaching the upward slope, the vehicle runs at a constant speed.

In FIG. 4, drive forces shown with small and large curves are obtained by a prior art method of controlling a motor output so as to generate an assist power in proportion to a leg-power. The smaller curve shows a drive force (man-power) Ph by a leg-power Ta, and the large curve having the same phase as that of the small curve shows an assist power Pm by the motor. As is apparent from the figure, in accordance with the prior art method of controlling the motor output so as to generate the assist-power Pm with a ratio between the man-power Ph and the assist power Pm kept at 1:1, although the assist-power Pm is increased on the upward slope, the man-power Ph is also kept at a high level on the upward slope.

On the contrary, according to this embodiment, the motor output is controlled such that, on either of the flat road, the upward slope, and the downward slope, a driver generates only a specific drive force against a running resistance of the motor-assisted bicycle equivalent to a flat road running resistance of a comfortable bicycle. Only a running resistance Ra generated by running of the motor-assisted bicycle equivalent to a running resistance generated by running of a relatively lightweight ordinary bicycle generally called a "comfortable bicycle" power on a flat road is created by a manual power input. The remaining resistance is assisted by the output of the motor 14.

With this configuration, a driver can drive the motor-assisted bicycle on any road with a feeling similar to that obtained by the operation of a comfortable bicycle on a flat road. As shown in FIG. 4, a motor torque is generated so as to generate an assist-power Pm against a resistance Ra actually generated at the time of running of the motor-assisted bicycle. At this time, the motor torque is determined such that a value (Ra−Pm) becomes a specific value. In other words, a driver can drive the motor-assisted bicycle with a specific leg-power Ta against a running resistance equivalent to a flat road running resistance of a comfortable bicycle.

The above-described output control will be more fully described hereinafter. It is to be noted that the content of the above-described output control provides only a description of a basic concept of this embodiment. Therefore, a method of controlling an output of the motor contains various modifications of the basic concept of the above-described output control.

Figure 1:
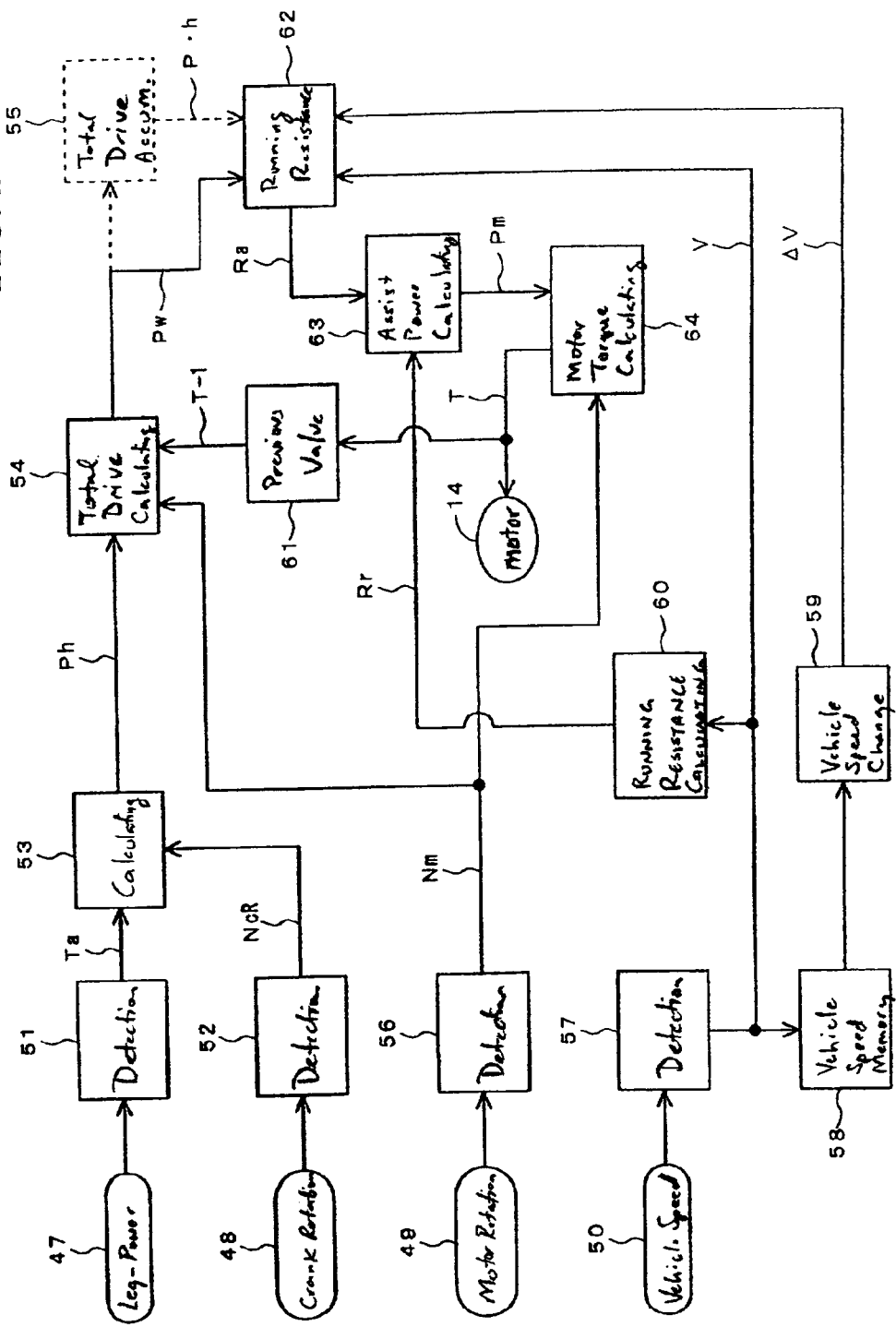
FIG. 1 is a block diagram showing functions of various portions of a control unit according to one embodiment of the present invention.

FIG. 1 is a block diagram showing functions of various portions of a control unit according to one embodiment of the present invention. FIG. 1 is a block diagram showing functions of essential portions of a control unit for controlling an output of the motor 14 in accordance with a real running resistance. The calculating and storing operations of the control unit can be realized by configuring the control unit as a microcomputer. A leg-power detecting portion 51 detects a leg-power Ta on the basis of a detection signal from the leg-power sensor 47. A crank rotational number detecting portion 52 detects a crank rotational number NCR on the basis of a detection signal from a crank rotational sensor 48. A manual power calculating portion 53 calculates a drive force Ph proportional to a leg-power inputted from the pedals 24 by using the following equation:

$$Ph = Ta \times NCR \times k1; \text{ wherein } k1 \text{ is a coefficient.} \quad \text{(Equation 1)}$$

A total drive force calculating portion 54 calculates a total drive force Pw by adding the drive force Ph obtained by a manual power to a motor output based on a motor torque T and a motor rotational number Nm. The motor torque T used here is a previous value, e.g. a value (T−1) stored in a previous value memory 61.

A motor rotational number detecting portion 56 detects the motor rotational number Nm on the basis of a detection signal from a motor rotation sensor 49. A vehicle speed detecting portion 57 detects a vehicle speed V on the basis of a detection signal from a vehicle speed sensor 50. The above-described magnetic pole sensor 41 can be used for each of the motor rotation sensor 49 and the vehicle speed sensor 50.

A vehicle speed memory 58 stores a previous detection value (V−1) of the vehicle speed V. A vehicle speed change amount calculating portion 59 calculates a difference ΔV between the previous value (V−1) and the present value V of the vehicle speed V. A standard running resistance calculating portion 60 calculates a flat road running resistance Rr of an ordinary bicycle by retrieving it from a map on the basis of the vehicle speed V.

A running resistance calculating portion 62 calculates an actual running resistance Ra by retrieving it from a map, prepared for each vehicle speed V, on the basis of the total drive force Pw and the vehicle speed change amount ΔV. The map used for calculating the actual running resistance Ra will be described hereinafter. In the calculation performed by the running resistance calculating portion 62, an accumulated value of the total drive force Pw may be used in place of the total drive force Pw. In this case, a total drive force accumulating portion 55 is provided. An output thereof can be used as the accumulated value of the total drive force Pw. Specifically, the total drive force accumulating portion 55 accumulates the total drive force Pw for each specific time or in each specific period of time, to obtain an accumulated value P·h, for example, obtain an accumulated value P·h of the total drive force Pw during one rotation of the crankshaft 22.

An assist power calculating portion 63 subtracts the ordinary bicycle's flat road running resistance Rr from the actual running resistance Ra, to calculate an assist power Pm to be provided by the motor 14. A motor torque calculating portion 64 calculates a motor torque T to be generated by the motor 14 on the basis of the motor rotational number Nm and the assist power Pm. The motor torque T is obtained by retrieving it from a map predetermined as a function of the motor rotational number Nm and the assist power Pm. The calculated motor torque T is outputted to a controller of the motor 14 and is stored in the previous value memory 61.

As described above, according to the control unit in this embodiment, the actual running resistance Ra is obtained on the basis of a change in vehicle speed corresponding to an energy inputted during one rotation of the pedals 24. A drive force against a resistance obtained by subtracting the ordinary bicycle's flat road running resistance Rr from the actual running resistance Ra is outputted from the motor 14 and is added to the manual power input.

Figure 5:
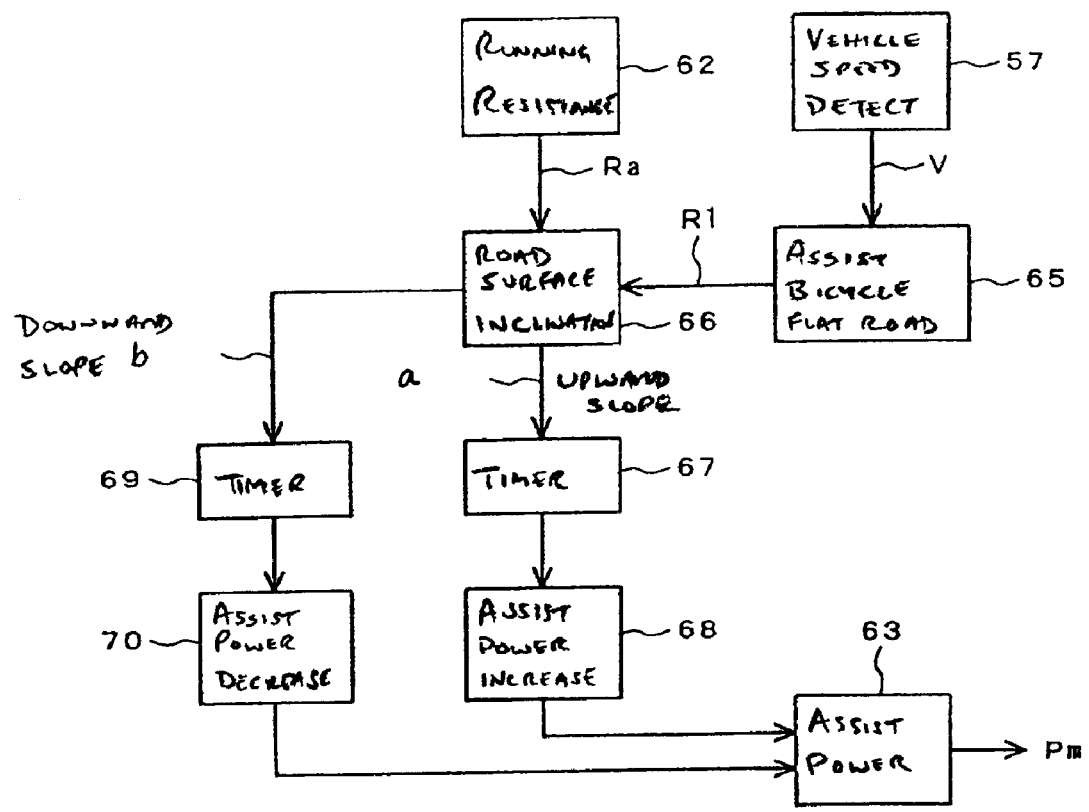
FIG. 5 is a block diagram showing functions for controlling an assist power at the time of initial startup for a bicycle on an inclined surface.

FIG. 5 is a block diagram showing functions for controlling an assist power at the time of initial startup for a bicycle on an inclined surface (continued from those shown in FIG. 1). The control unit includes a road surface inclination deciding portion for adjusting an increased or decreased amount of the assist power Pm depending on a road surface inclination. In FIG. 5, an assist bicycle's flat road running resistance calculating portion 65 calculates a flat road running resistance R1 of an assist bicycle (motor-assisted bicycle) by retrieving it from a predetermined map according to the vehicle speed V.

On the basis of the actual running resistance Ra calculated by the running resistance calculating portion 62 and the assist bicycle's flat road running resistance R1, the road surface inclination deciding portion 66 determines if the vehicle runs on an upward slope if the actual running resistance Ra is larger than the flat road running resistance R1 by a specific value. The road surface inclination deciding portion 66 also determines if the vehicle runs on a downward slope if the actual running resistance Ra is smaller than the flat road running resistance R1 by a specific value. At the time of startup of the running of the vehicle on the upward slope, a timer 67 is started and an assist force increasing portion 68 is operated until the counting of the timer 67 ends. On the other hand, at the time of start of running of the vehicle on the downward slope, a timer 69 is started, and an assist power decreasing portion 70 is operated until the counting of the timer 69 ends.

The assist power increasing portion 68 corrects a coefficient used for calculating the assist power so as to increase the assist power Pm, and the assist power decreasing portion 70 corrects a coefficient used for calculating the assist power so as to decrease the assist power Pm. On the basis of the corrected coefficients supplied from the assist power increasing portion 68 and the assist power decreasing portion 70, the assist power calculating portion 63 outputs an assist power Pm corrected in accordance with the determined road surface inclination.

Figure 6:
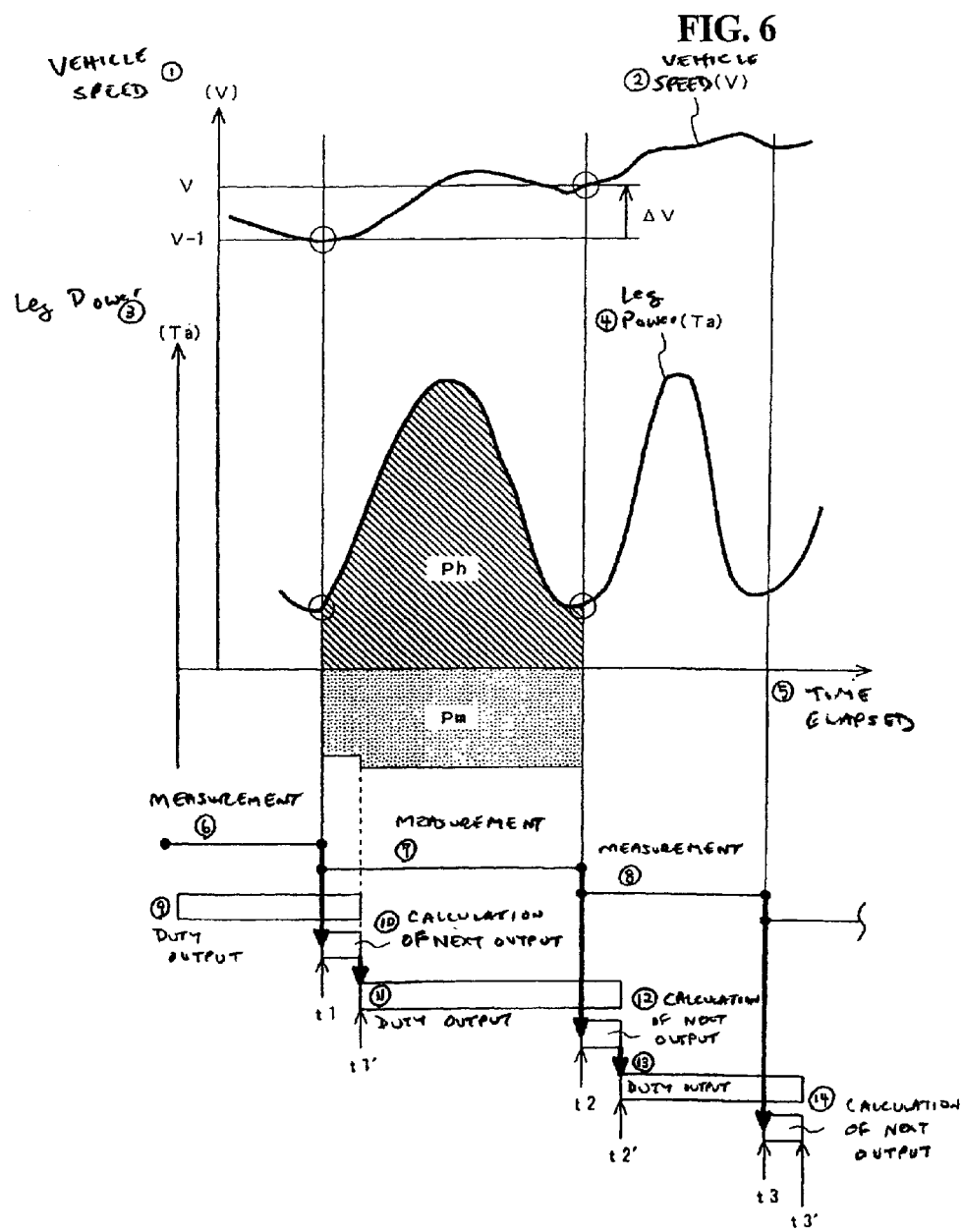
FIG. 6 is a timing chart showing the timing of determination of an assist power due to a vehicle speed and a manual power.

FIG. 6 is a timing chart showing the timing of determination of an assist power due to a vehicle speed and a manual power. FIG. 6 is a diagram showing the timing of determination of an assist power. A vehicle speed V, a leg-power Ta, and an assist power Pm by the motor together with detecting and calculating timings thereof are shown in FIG. 6. Detection outputs of respective sensors are read out in a period of time between a time point when the minimum value of the leg-power Ta is detected and a time point when the next minimum value of the leg-power Ta is detected.

Each time the leg-power Ta equals the minimum value, calculation of the next assist power Pm is started on the basis of detection values of respective sensors at that time. The vehicle speed V is also detected and a difference ΔV between the previous vehicle speed and the same is calculated. For example, at each of timings t1, t2, and t3, the assist power Pm is calculated and the difference-invehicle speed (V−(V−1)) is calculated. Further, a current-carrying duty for obtaining the assist power Pm whose calculation has been started at each of the timings t1, t2, and t3 is set at each of timings t1', t2', and t3'.

Figure 7:
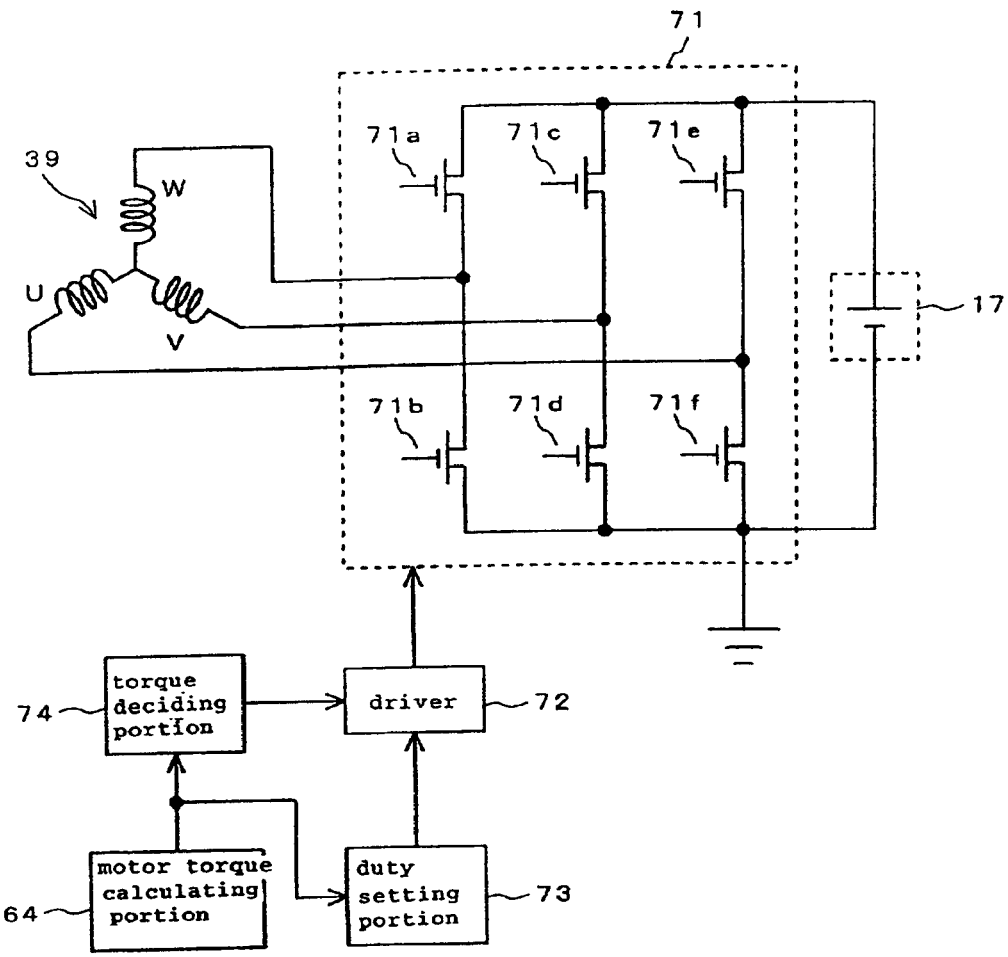
FIG. 7 is a control circuit diagram of a motor according to an embodiment of the present invention.
Figure 8:
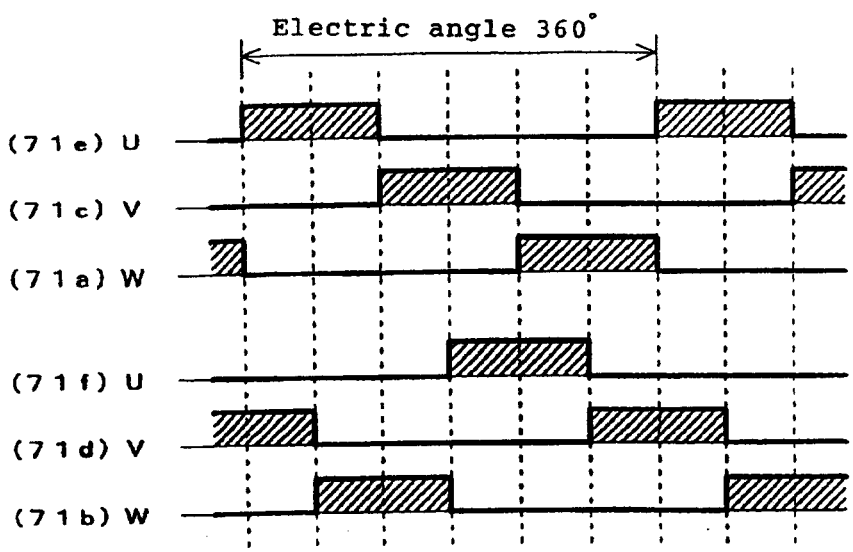
FIG. 8 is a timing chart showing a control timing of a motor according to an embodiment of the present invention.

FIG. 7 is a control circuit diagram showing output control of the motor 14 according to an embodiment of the present invention. FIG. 8 is a timing chart showing a control timing of a motor according to an embodiment of the present invention, wherein a current-carrying timing and a current-carrying duty are shown. In FIG. 7, a full wave rectifier 71 has FETs (in general, individual switching elements) 71a, 71b, 71c, 71d, 71e, and 71f connected to the three-phase stator coil 39. The current-carrying to the FETs 71a to 71f is controlled by a driver 72. The current-carrying duty is set by a duty setting portion 73 on the basis of a command supplied from the motor torque calculating portion 64 and is inputted in the driver 72.

At a driving timing for giving an assist power Pm, a current-carrying duty is supplied from the duty setting portion 73 to the driver 72. On the basis of the current-carrying duty, the driver 72 energizes the FETs 71a to 71f to supply a current from the battery 17. In the case of generating a regeneration output, at a regeneration timing offset from the driving timing by an electric angle of 180°, a current-carrying duty is supplied from the duty setting portion 73 to the driver 72. On the basis of the current-carrying duty, the driver 72 energizes the FETs 71a to 71f. When the FETs 71a to 71f are energized at the regeneration timing, a current generated in the stator coil 39 is rectified by the FETs 71a to 71f to be supplied to the battery 17.

Whether or not a current-carrying timing is a driving timing or a regeneration timing is decided on the basis of a required motor torque T supplied from the motor torque calculating portion 64. If the required value T of the motor torque is positive, the current-carrying timing is set to the driving timing, and if the required value T of the motor torque is negative, the current-carrying timing is set to the regeneration timing.

In FIG. 8, each of the FETs 71a to 71f is energized with a current-carrying angle set to an electric angle of 120°. FIG. 8 shows a current-carrying timing taken as a driving timing. At a regeneration timing, the timing of each of the FETs 71a, 71c and 71e on the "high" side is offset from the driving timing by an electric angle of 180°.

Figure 9:
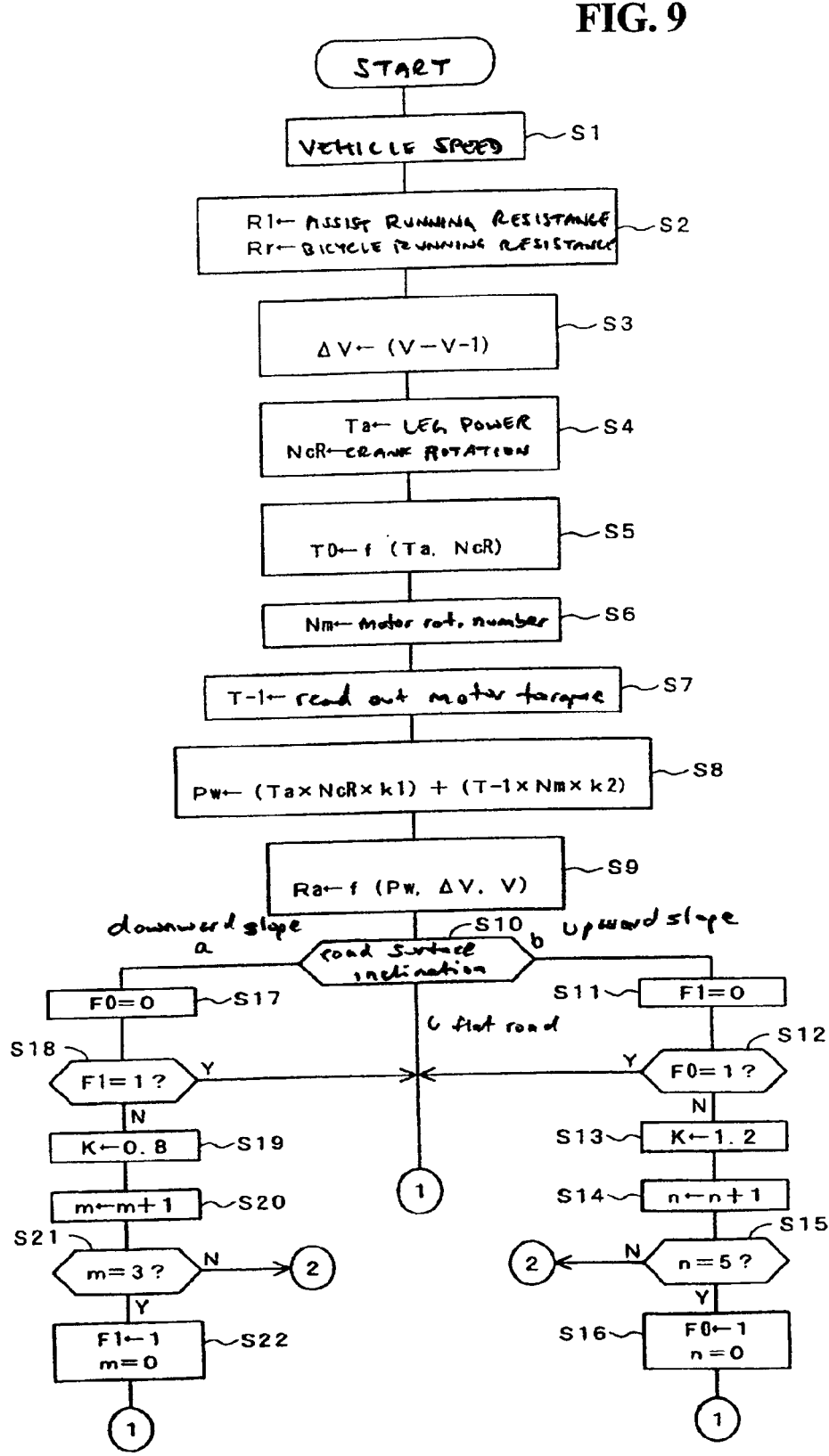
FIG. 9 is a detailed flow chart showing steps of a process of generating an assist power in accordance with an actual running resistance according to an embodiment of the present invention.
Figure 10:
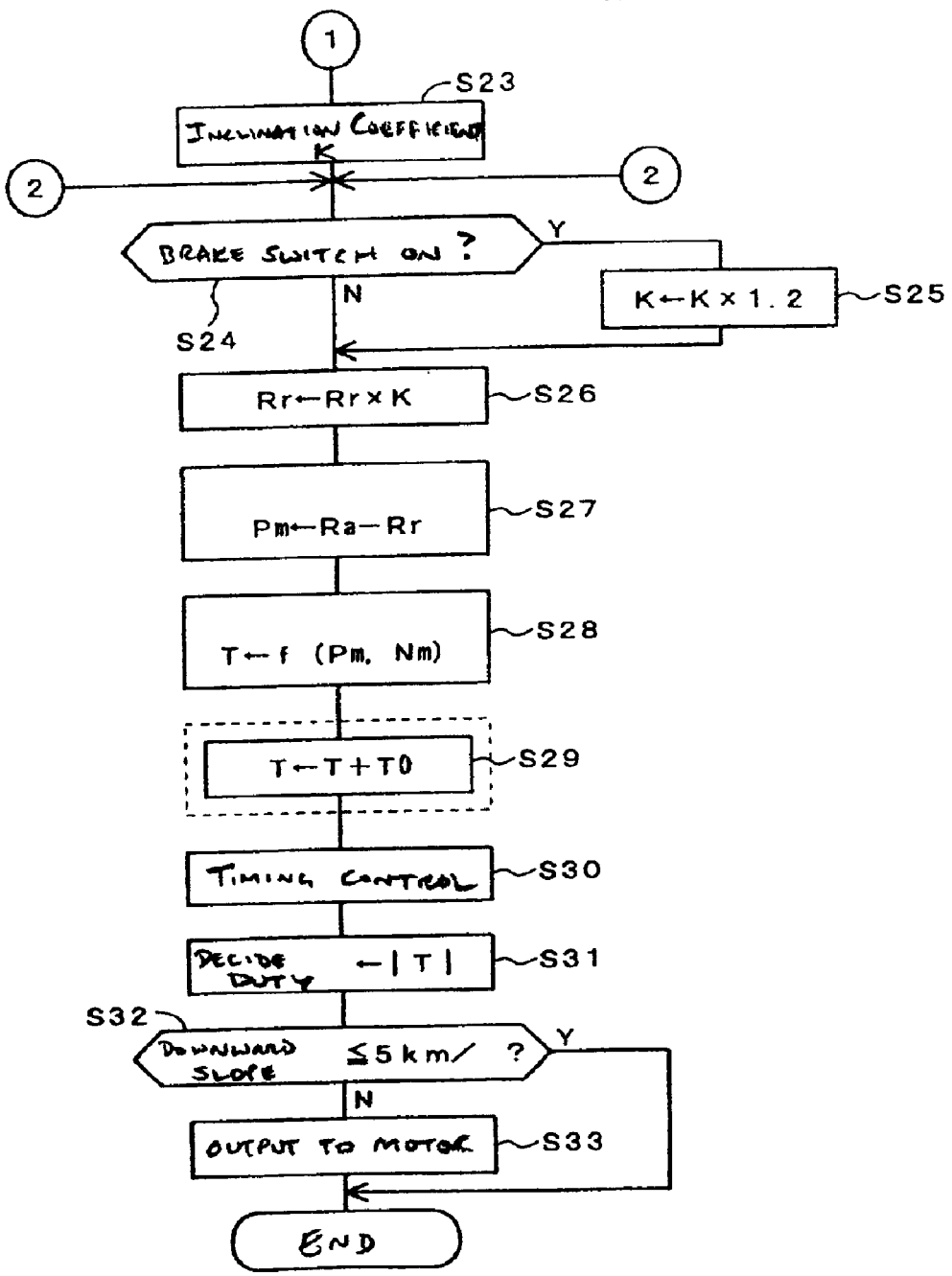
FIG. 10 is a detailed flow chart showing continuing steps of the process of generating an assist power in accordance with an actual running resistance shown in FIG. 9.

FIG. 9 is a detailed flow chart showing steps of a process of generating an assist power in accordance with an actual running resistance according to an embodiment of the present invention. FIG. 10 is a detailed flow chart showing continuing steps of the process of generating an assist power in accordance with an actual running resistance shown in FIG. 9. In step S1, a vehicle speed V is calculated on the basis of a detection output of the motor rotation sensor 49.

In step S2, a flat road running resistance R1 of a motor-assisted bicycle (hereinafter, referred to as "assist bicycle") and a flat road running resistance Rr of an ordinary bicycle (comfortable bicycle) are calculated on the basis of the vehicle speed V.

For example, a flat road running resistance of a comfortable bicycle having a weight of 12 kg driven by a driver having a weight of 55 kg is taken as the ordinary bicycle's flat road running resistance Rr, and a flat road running resistance of an assist bicycle having a weight of 26 kg driven by a driver having a weight of 65 kg is taken as the assist bicycle's flat road running resistance R1. These flat road running resistances R1 and Rr can be retrieved from a predetermined map.

Figure 11:
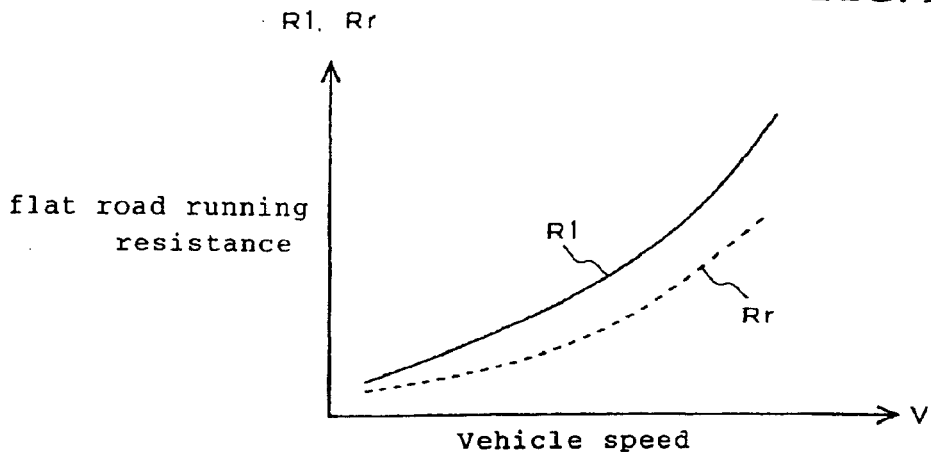
FIG. 11 is a graphical view showing a relationship between a vehicle speed and a flat road running resistance.

FIG. 11 is a graphical view showing a relationship between a vehicle speed and a flat road running resistance. FIG. 11 shows one example of a predetermined map indicating a relationship between the vehicle speed V and the flat road running resistances R1 and Rr. In this figure, each of the assist bicycle's flat road running resistance R1 and the ordinary bicycle's flat road running resistance Rr is shown as a function of the vehicle speed V. Each of the assist bicycle's flat road running resistance R1 and the ordinary bicycle's flat road running resistance Rr can be obtained by retrieving it from the map shown in FIG. 11 on the basis of the given vehicle speed V.

Referring again to FIG. 9, in step S3, a difference (V−(V−1)) between a previous detection value (V−1) and a present detection value V of the vehicle speed is calculated to obtain a vehicle speed change amount ΔV (if the value is negative, the vehicle decelerates). In step S4, a leg-power Ta and a crank rotational number NCR are detected from detection outputs of the leg-power sensor 47 and the crank rotation sensor 48, respectively. In step S5, a motor output proportional to the leg-power, which is a function of the leg-power Ta and the crank rotational number NCR, e.g. a motor torque T0, is calculated on the basis of the following equation:

$$T0 = f(Ta, NCR) \quad \text{(Equation 2)}$$

In step S6, an output of the motor rotation sensor 49, e.g. a rotational number Nm of the motor 14, is detected. In step S7, a previous motor torque (T−1) is read out of the previous value memory 61. In step S8, a total drive force Pw, e.g. the total of a manual power Ph and an assist power Pm−1 is calculated on the basis of the following equation:

$$Pw = (Ta \times NCR \times k1) + ((T-1) \times Nm \times k2); \quad \text{(Equation 3)}$$

wherein k1 and k2 are coefficients.

In step S9, an actual running resistance Ra, which is a function of the drive force Pw, the vehicle speed change amount ΔV, and the vehicle speed V, is calculated on the basis of the following equation:

$$Ra = f(Pw, \Delta V, V) \quad \text{(Equation 4)}.$$

The actual running resistance Ra is obtained by preparing a map indicating a relationship among the drive force Pw, the vehicle speed change amount ΔV, and the actual running resistance Ra for each vehicle speed (for example, for each 5 km/hr interval in speed), and retrieving the actual running resistance Ra from the maps.

Figure 12:
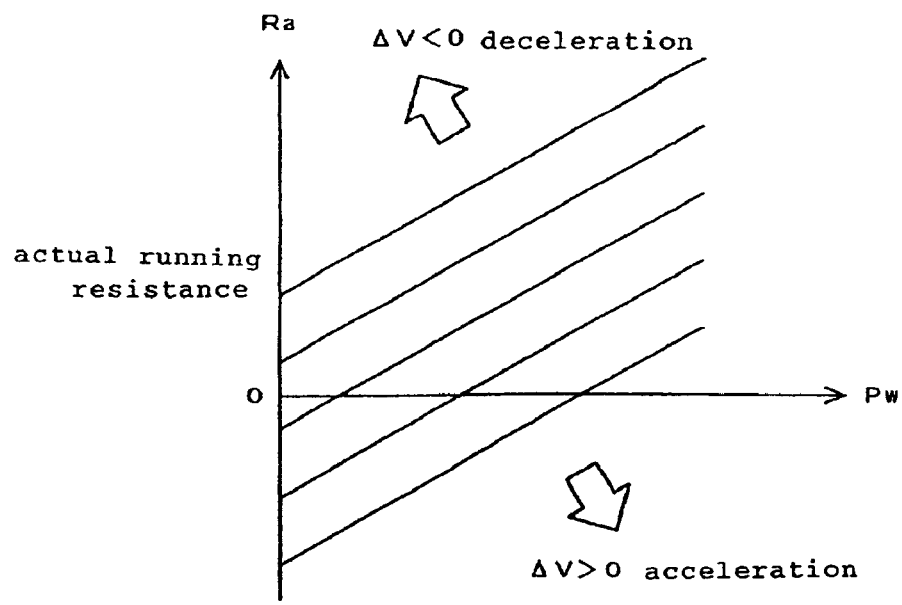
FIG. 12 is a graphical view showing an example in which an actual running resistance is retrieved on the basis of a vehicle speed change amount and a drive force.

FIG. 12 is a graphical view showing an example in which an actual running resistance is retrieved on the basis of a vehicle speed change amount and a drive force. FIG. 12 shows one example of such a map indicating a relationship among the drive force Pw, the vehicle speed change amount ΔV, and the actual running resistance Ra with the vehicle speed change amount ΔV taken as a parameter. Each of the assist bicycle's flat road running resistance R1 and the ordinary bicycle's flat road running resistance Rr is shown as a function of the vehicle speed V. Such a map is prepared for each vehicle speed V. As described above, an accumulated amount P·h for one cycle, that is, for one rotation of the crankshaft 22 may be used in place of the drive force Pw.

In step S10, it is determined if a road surface is inclined, e.g. whether a road is an upward slope or a downward slope. Such a decision can be performed on the basis of a ratio between the actual running resistance Ra and the assist bicycle's flat road running resistance R1. For example, if a value of the ratio (Ra/R1) is "5" or more, it is determined that the road is an upward slope. If the ratio (Ra/R1) is "−1", it is determined that the road is a downward slope. If the ratio (Ra/R1) is in a range of 5 to −1, it is determined that the road is a flat road.

If it is determined that the road is an upward slope, the process goes on to step S11, in which a flag F1 indicating a downward slope is cleared. In step S12, it is decided whether or not a flag F0 indicating an upward slope is set. If YES, the process goes on to step S23 (see FIG. 10), and if NO, the process goes on to step S13, in which a coefficient K is set to "1.2". As will be described later, by increasing the coefficient K, the assist power Pm is decreased, thereby informing a driver that the vehicle has reached an upward slope.

In step S14, a count value "n" is incremented. In step S15, it is decided whether or not the counter value "n" becomes "5". If YES, the process goes on to step S16, in which the counter value "n" is cleared and the flag F0 is cleared, and then the process goes on to step S23 (see FIG. 10). In step S23, an inclination correcting value is calculated (which will be described later with reference to FIGS. 15 and 16). If the answer of step S15 is negative, e.g. if it is decided in step S15 that the counter value "n" does not become "5", the process goes on to step S24 (see FIG. 10).

If it is determined in step S10 that the road is a downward slope, the process goes on to step S17, in which the flag F0 indicating an upward slope is cleared. In step S18, it is determined whether or not the flag F1 indicating a downward slope is set. If YES, the process goes on to step S23 (see FIG. 10), while if NO, the coefficient K is set to "0.8". As described later, by decreasing the coefficient K, the assist power Pm is increased, thereby informing the driver that the vehicle has reached a downward slope.

In step S20, a counter value "m" is incremented. In step S21, it is decided whether or not the counter value "m" becomes "3". If YES, the process goes on to step S22 in which the counter value "m" and the flag F1 is cleared, and then the process goes on to step S23. If NO, the process goes on to step S24 (see FIG. 10). If it is determined in step S10 that the road is a flat road, the processes for the coefficient K and the counter values "n" and "m" are not performed, and the process goes on to step S24.

Referring to FIG. 10, in step S24, it is determined whether or not a brake switch is turned on. If YES, the process goes on to step S25, in which the coefficient K is multiplied by a constant value "1.2", and then the process goes on to step S26. As will be described later, by multiplying the coefficient K by a constant value, a regeneration output is increased. If the answer of step S24 is negative, e.g. it is decided in step S24 that the brake switch is not turned on, the process goes on to step S26 while skipping step S25. In step S26, the ordinary bicycle's flat road running resistance Rr is multiplied by the coefficient K. In step S27, an assist-power Pm is calculated on the basis of the following equation:

$$Pm = Ra - Rr \quad \text{(Equation 5)}.$$

As is apparent from Equation 5, when the ordinary bicycle's flat road running resistance Rr is large, the assist power Pm becomes small, and when the ordinary bicycle's flat road running resistance Rr is small, the assist power Pm becomes large. Since the ordinary bicycle's flat road running resistance Rr is multiplied by the coefficient K in step S26, the assist power Pm is changed by the coefficient K. Accordingly, if it is decided that the road is an upward slope and the coefficient K is set to "1.2" (step S13), the assist power Pm becomes small in a period of time until the counter value "n" becomes the predetermined value "5", with a result that the driver feels that a pedaling load is increased. On the other hand, if it is decided that the road is a downward slope and the coefficient K is set to "0.8" (step S19), the assist power Pm becomes large in a period of time until the counter value "n" becomes the predetermined value "3", with a result that the driver feels that a pedaling load is decreased.

In the case of increasing the coefficient K in step S25, the regeneration output is increased for the following reason. In a driving state requiring braking, the total drive force Pw is small and the actual running resistance Ra is a negative value. Accordingly, if the running resistance Rr is increased by increasing the coefficient K, the negative value of the actual running resistance Ra becomes larger by the processing in step S27 with a result that the regeneration output is increased. In the driving state requiring braking, the braking operation accompanied by regeneration of the motor 14 can be effectively performed.

In step S28, a motor torque T, which is a function of the assist power Pm and the motor rotational number Nm, is calculated on the basis of the following equation:

$$T = f(Pm, Nm) \quad \text{(Equation 6)}.$$

In addition, the motor torque T may be changed as follows. In step S29, a motor torque T0 proportional to the leg-power is added to the motor torque T. The driver can drive the vehicle over the entire running region of the vehicle with this change of the motor torque T.

In step S30, a current-carrying timing of the motor 14 can be controlled. If the calculated motor torque T is positive, the control elements (FETs) of the full wave rectifier 71 for controlling the motor 14 are energized at a driving timing. If the calculated motor torque T is negative, the control elements (FETs) for controlling the motor 14 are energized at a regeneration timing that is offset from the driving timing by an electric angle of 180°. In step S31, a current-carrying duty is determined on the basis of an absolute value of the motor torque T.

In step S32, if it has been decided that the road has a downward slope, it is determined whether or not the vehicle speed V is a predetermined low speed (for example, 5 km/hr) or less. If NO, the process goes on to step S33, in which the assist power Pm, which has been calculated in step S27 using the flat running resistance Rr calculated in step S26, is outputted to the motor 14. If YES, the process is ended. When it has been decided that the road is a downward slope, if it is decided that the vehicle speed V is a low speed state, e.g. in a state in which the driver walks his or her bicycle, the current-carrying control of the motor 14 is not performed so that the regeneration control output is not generated.

Figure 13:
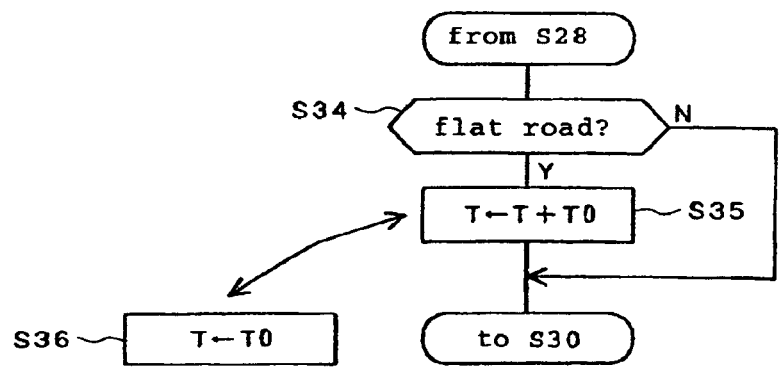
FIG. 13 is a flow chart showing a modification of process step S29 according to an embodiment of the present invention.

FIG. 13 is a flow chart showing a modification of process step S29 according to an embodiment of the present invention. The processing in step S29 may be modified into processes shown in FIG. 13. Referring to FIG. 13, in step S34, it is decided whether or not the road is a flat road. If YES, the process goes on to step S35 in which a motor torque T0 proportional to the leg-power is added to the motor torque T. The processing in step S35 may be replaced with a processing in step S36, in which the motor torque T is replaced with the motor torque T0 proportional to the leg-power. With this configuration, the driver can drive the bicycle with the assist power Pm proportional to the leg-power.

Figure 14:
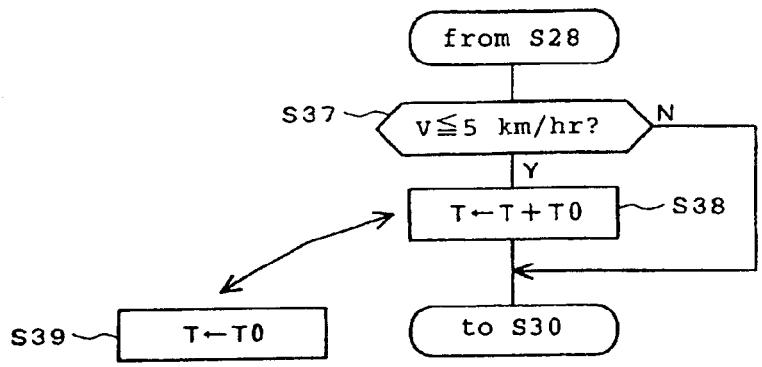
FIG. 14 is a flow chart showing another modification of process step S29 according to an embodiment of the present invention.

FIG. 14 is a flow chart showing another modification of process step S29 according to an embodiment of the present invention. The processing in step S29 may be further modified into processes shown in FIG. 14. In step S37, it is decided whether or not the vehicle speed V is a predetermined low speed (for example, 5 km/hr) or less. If YES, the process goes on to step S38 in which the motor torque T0 proportional to the leg-power is added to the motor torque T. The processing in step S38 may be replaced with a processing in step S39 in which the motor torque T is replaced with the motor torque T0 proportional to the leg-power. With this configuration, e.g. at the time of start of pedaling, the driver can drive the bicycle with the assist power Pm obtained from the motor torque T proportional to the leg-power.

Figure 17:
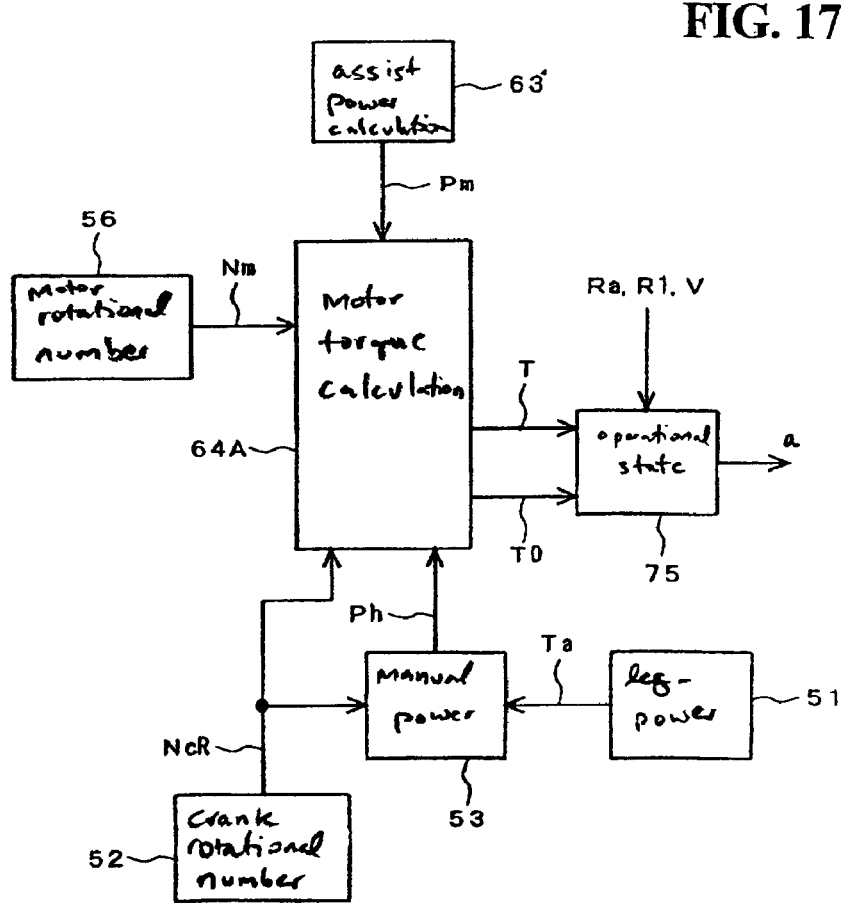
FIG. 17 is a block diagram showing a function of selectively using either of an assist power that is proportional to a leg-power and/or an assist power corresponding to an actual running resistance.

FIG. 17 is a block diagram showing a function of selectively using either of an assist power that is proportional to a leg-power and/or an assist power corresponding to an actual running resistance. FIG. 17 is a block diagram showing functions of respective portions carrying out the processes in step S29 and the modifications thereof. A motor torque calculating portion 64A calculates, like the calculating portion 64 shown in FIG. 1, a motor torque T as a function of an assist power Pm by the motor 14 and a motor rotational number Nm. The motor torque calculating portion 64A further calculates a motor torque T0 as a function of a drive force Ph proportional to a leg-power detected by a manual power calculating portion 53 and a crank rotational number NCR.

An operational state deciding portion 75 decides an operational state of the vehicle on the basis of an actual running resistance Ra, an assist bicycle's flat road running resistance R1, a vehicle speed V, and the like. On the basis of the operational state of the vehicle, the operational state deciding portion 75 supplies to the motor 14, either a signal indicating the motor torque T, the motor torque T to which the motor torque T0 is added, or the motor torque T0.

Figure 15A:
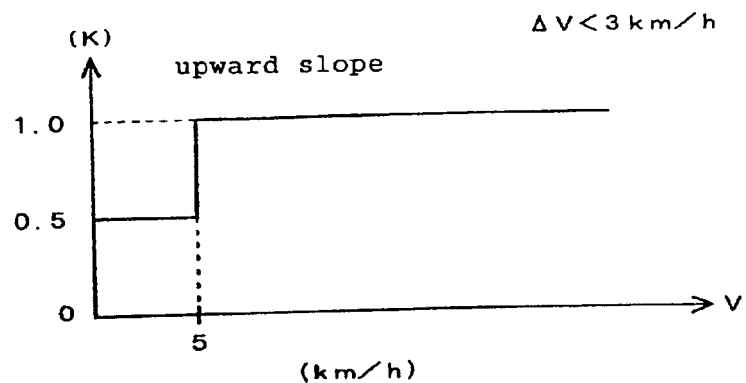
FIG. 15(a) and FIG. 15(b) are graphical views (Part 1) each showing a relationship between a correction coefficient of an assist power and a vehicle speed.
Figure 15B:
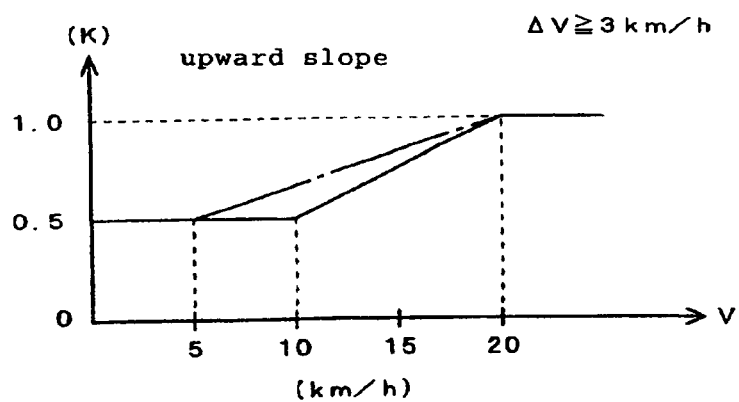

Examples of the processing in the above-described step S23 will be described hereinafter. In step S23, the coefficient K is corrected so as to be matched with an inclination of the running road. An example of correcting the coefficient K in the case of running on an upward slope will be first described. FIG. 15(a) and FIG. 15(b) are graphical views (Part 1) each showing a relationship between a correction coefficient of an assist power and a vehicle speed. FIGS. 15(a) and 15(b) show values of the coefficient K corresponding to the vehicle speed V in the case of running on an upward slope. FIG. 15(a) shows a case where a vehicle speed change amount for one second is less than 3 km/hr, and FIG. 15(b) shows a case where the vehicle speed change amount is 3 km/hr or more. In addition, an initial value of the coefficient K is set to "1.0".

In the case shown in FIG. 15(a), where the vehicle speed V is low (for example, 5 km/hr or less), for example, at the time of start of pedaling, the coefficient K is set to a lower value to increase the assist power Pm, and is then returned to the initial value after the vehicle speed V is increased. In the case shown in FIG. 15(b), where the vehicle speed V is low (for example, 5 km/hr or 10 km/hr), the coefficient K is set to a lower value to increase the assist power Pm, and is then gradually returned to the initial value with an increase in vehicle speed V. Accordingly, at the time of acceleration, the assist power Pm is not rapidly reduced but is kept at a large value until the vehicle speed V is increased to a certain value (for example, 20 km/hr). The example of correcting the coefficient K in the case of running on an upward slope can be applied to the correction of the coefficient K in the case of running on a flat road.

Figure 19:
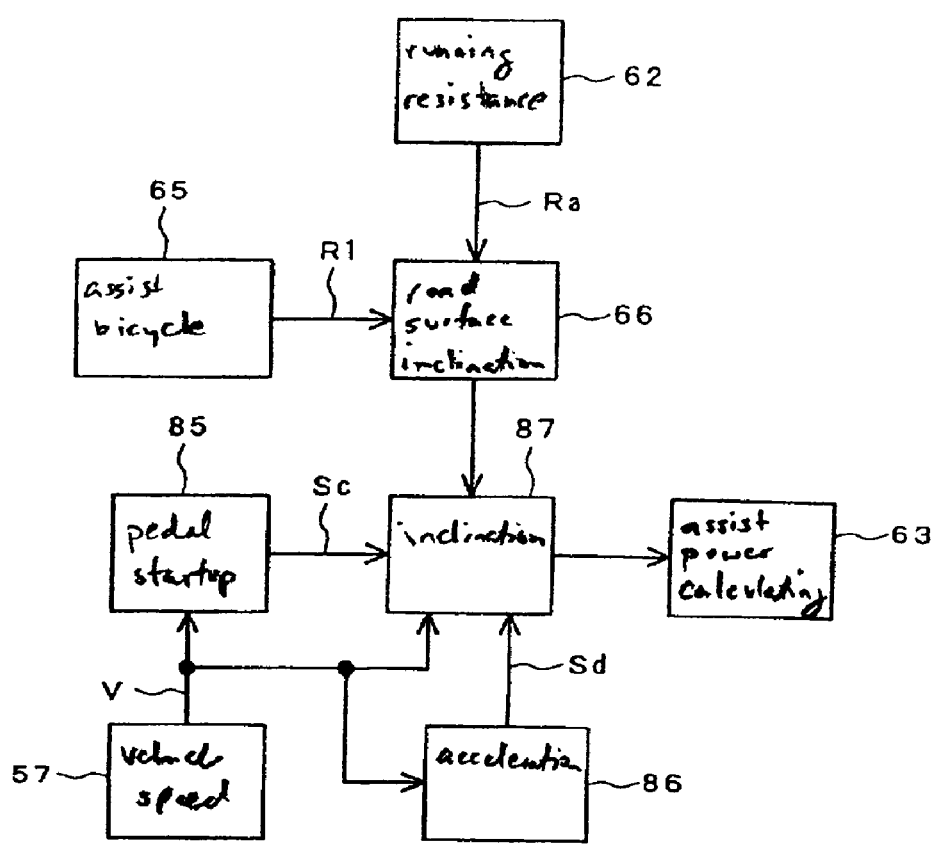
FIG. 19 is a block diagram showing functions for increasing an assist power in accordance with an inclination of a road surface according to an embodiment of the present invention.

FIG. 19 is a block diagram showing functions for increasing an assist power in accordance with an inclination of a road surface according to an embodiment of the present invention. FIG. 19 is a block diagram showing functions of portions for increasing the assist power on an upward slope and a flat road in step S23. Referring to FIG. 19, when a vehicle speed V is equal to or less than a predetermined low vehicle speed, a deciding portion 85 for determining the start of pedaling outputs a detection signal Sc. When acceleration is equal to or more than a predetermined value (a change in speed during one rotation of the crank is 3 km/hr), an acceleration deciding portion 86 outputs a detection signal Sd on the basis of a change amount of the vehicle speed V.

When determining if the road is a flat road or an upward slope on the basis of the ratio between the actual running resistance Ra and the flat road running resistance R1 as described above, a road surface inclination deciding portion 66 causes an inclination correcting portion 87 to select a map (for example, the map shown in FIG. 15) corresponding to the start-of-pedaling detection signal Sc or the acceleration detection signal Sd.

A coefficient K set to increase the assist power is retrieved from the map on the basis of the vehicle speed V. The coefficient K is inputted into the assist power calculating portion 63, and the assist-power is calculated so as to be increased by the assist power calculating portion 63 on the basis of the coefficient K. An example of correcting the coefficient K in the case of running on a downward slope will be described hereinafter.

Figure 16:
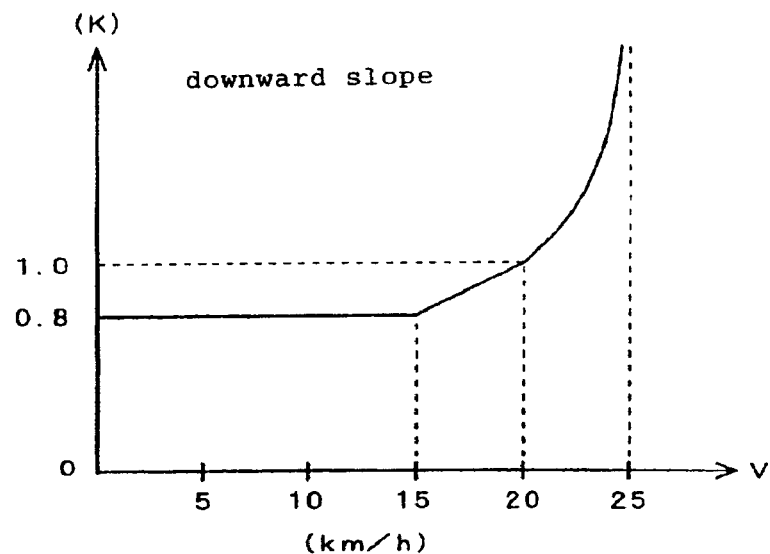
FIG. 16 is a graphical view showing a relationship between the correction coefficient of the assist power and the vehicle speed.

FIG. 16 is a graphical view showing a relationship between the correction coefficient of the assist power and the vehicle speed. FIG. 16 shows a value of the coefficient K corresponding to the vehicle speed V in the case of running on a downward slope. An initial value of the coefficient K is set to "1.0".

As seen in FIG. 16, when the vehicle speed V is low (for example, 15 km/hr or less), e.g. at the time of start of pedaling on a downward slope, the coefficient K is set to a small value to decrease a regeneration output. When the vehicle speed V is increased, e.g. in a period from a time point of 15 km/hr to a time point of 20 km/hr, the coefficient K is increased in proportion to the increase in vehicle speed V to gradually increase the regeneration output. When the vehicle speed V is further increased, e.g. to a certain value such as 25 km/hr, the coefficient K is rapidly increased (for example, along a quadric curve) to rapidly increase the regeneration output and rapidly restrict the vehicle speed V.

Figure 18:
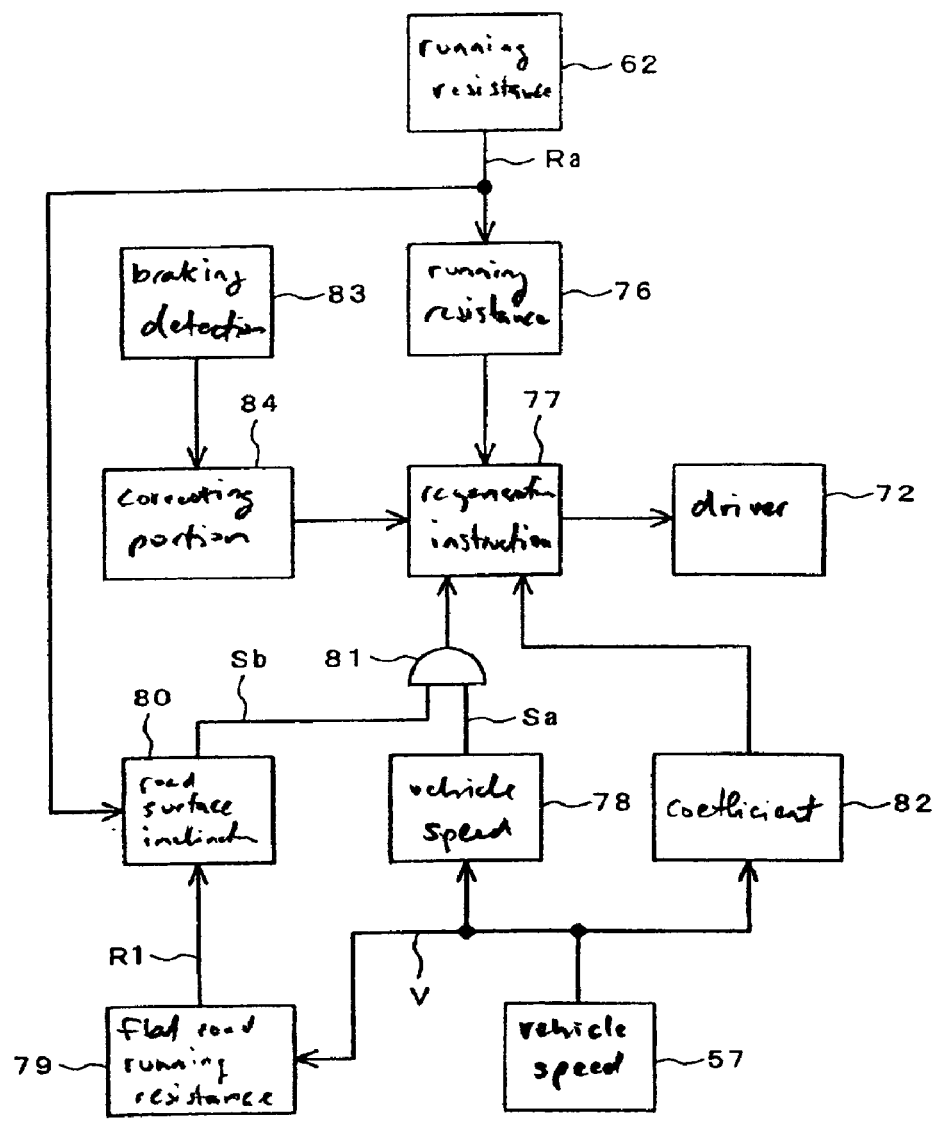
FIG. 18 is a block diagram showing functions for controlling a regeneration output according to an embodiment of the present invention.

FIG. 18 is a block diagram showing functions for controlling a regeneration output according to an embodiment of the present invention. FIG. 18 is a block diagram showing functions of essential portions required for performing regeneration control. Referring to this figure, a running resistance deciding portion 76 determines whether the actual running resistance Ra inputted from the running resistance calculating portion 62 is positive or negative. If the actual running resistance Ra is negative, the running resistance deciding portion 76 causes a regeneration instructing portion 77 to decide an operational state of the bicycle. An instruction to output regeneration is supplied to the driver 72 of the motor 14 on the basis of such decision. In addition, the operational state is determined based on whether or not a braking operation is performed, or whether or not the vehicle speed V is a predetermined value.

A vehicle speed deciding portion 78 decides whether or not the vehicle speed is a predetermined value (which is typically set to about a bicycle walking speed). If the vehicle speed V is less than the predetermined value, the vehicle speed deciding portion 78 outputs a detection signal Sa. A flat road running resistance calculating portion 79 holds data of the assist bicycle's flat road running resistance R1 corresponding to the vehicle speed V in the form of a map (for example, the map shown in FIG. 11). The flat road running resistance R1 is retrieved from the map on the basis of the inputted vehicle speed V. The flat road running resistance R1 is outputted in a road surface inclination deciding portion 80.

The road surface inclination deciding portion 80 decides whether or not the inclination of a road surface is a downward inclination on the basis of the actual running resistance Ra and the flat road running resistance R1. If the inclination of the road surface is a downward inclination, the road surface inclination deciding portion 80 outputs a detection signal Sb. If both the detection signals Sa and Sb are outputted, an AND gate is opened to output a signal indicating that the regeneration instruction is ineffective to the regeneration instructing portion 77.

A calculating portion 82 for calculating the coefficient K corresponding to the vehicle speed range holds data of the coefficient K in the form of a map (for example, the map shown in FIG. 16). The coefficient K is retrieved from the map on the basis of the inputted vehicle speed V and the coefficient K thus retrieved is outputted to the regeneration instructing portion 78. A braking detecting portion 83 outputs a detection signal when the brake switch is operated. A correcting portion 84 for correcting the coefficient K upon braking multiplies the coefficient K by a predetermined value when a detection signal from the braking detecting portion 83 is supplied thereto. The corrected coefficient K is then outputted to the regeneration instructing portion 77.

The regeneration instructing portion 77 calculates the motor torque by using the coefficient K corrected by the above-described correcting portion 84. Calculating portion 82 determines a regeneration output and supplies a regeneration instruction to the driver 72. If the instruction is a signal indicating that the regeneration instruction is ineffective, the regeneration instructing portion 77 does not give the regeneration instruction to the driver 72.

Accordingly, when the actual running resistance Ra is negative, the motor 14 is operated so as to generate a regeneration output. On the other hand, when it is decided that the road is a downward slope in accordance with the decision of the road surface inclination and the vehicle speed V is a low speed equal to or less than a predetermined value, the regeneration output is prohibited.

As described above, according to the present invention, since an assist power is increased in accordance with an operational state of the vehicle, at the time of startup (e.g., initial pedaling) or upon acceleration, it is possible to effectively generate an assist power even in a region with a low actual running resistance. In particular, the startup of pedaling can be arbitrarily set on the basis of the vehicle speed. Since the assist power is increased in an operational state, e.g. during start of pedaling or acceleration on a flat road or an upward slope, it is possible to more effectively provide the assist power to the motor-assisted bicycle.

Since an assist power can be generated irrespective of a periodical change in leg-driven manual drive source, a vehicle speed becomes significantly stable and a suitable assist power can be provided in accordance with an inclination of a road surface. Further, it is possible to drive the motor-assisted bicycle with the same running sensation as that obtained during running of the vehicle on a flat road.

A driver can drive the motor-assisted bicycle while feeling a change in inclination of a road surface. In particular, it is possible to drive the motor-assisted bicycle with the same running sensation as that obtained by an ordinary bicycle. It is also possible to decide an inclination of a road surface by the actual running resistance detecting means without providing an inclination sensor.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control unit for a motor-assisted vehicle including a manual powered drive system for transmitting a manual drive force to rear wheel and a motor drive system for transmitting a motor drive force by a motor to said rear wheel, said control unit comprising:

means for detecting that said vehicle has started a pedaling operation;

means for detecting an actual running resistance of a vehicle;

means for controlling and generating an assist drive force corresponding to the actual running resistance of said vehicle, wherein said means for controlling and generating increases the drive force generated by said motor drive system at a start of a pedaling operation of said vehicle;

means for detecting a vehicle speed change amount for a predetermined period of time; and means for detecting a total drive force obtained by adding the assist drive force of said motor to the manual drive force for the predetermined period of time; wherein the actual running resistance is calculated as a function of the vehicle speed change amount to the total drive force.

2. The control unit for a motor-assisted vehicle according to claim 1, further including means for detecting a speed of said vehicle, wherein a state indicative of the start of the pedaling operation is identified when the vehicle speed is in a predetermined vehicle speed range.

3. A control unit for a motor-assisted vehicle including a manual powered drive system for transmitting a manual drive force to a rear wheel and a motor drive system for transmitting a motor drive force by a motor to said rear wheel, said control unit comprising:

means for detecting an actual running resistance of a vehicle;

means for generating an assist drive force corresponding to the actual running resistance; and means for calculating and detecting an acceleration of said vehicle; wherein said means for generating the assist drive power increases the assist drive force generated by said motor drive system in accordance with the acceleration after a predetermined value of time.

4. The control unit for a motor-assisted vehicle according to claim 3, further including:

means for setting a predetermined running resistance of an ordinary bicycle;

means for determining the assist drive force generated by said motor drive system in accordance with a difference between the actual running resistance and the ordinary bicycle's running resistance; and means for determining an inclination of a road surface on the basis of the actual running resistance; wherein the motor drive force is increased when the road surface is a flat road or an upward slope; and the increasing operation of the motor drive force is performed by reducing the ordinary bicycle's running resistance.

5. The control unit for a motor-assisted vehicle according to claim 4, wherein the assist drive force generated by said motor drive system is controlled in such a manner that the actual running resistance of said vehicle substantially corresponds to a flat road running resistance of said vehicle.

6. The control unit for a motor-assisted vehicle according to claim 5, wherein the flat road running resistance is set to a flat road running resistance of an ordinary bicycle.

7. A control unit for a motor-assisted vehicle including a manual powered drive system for transmitting a manual drive force to a rear wheel and a motor drive system for transmitting a motor drive force by a motor to said rear wheel, said control unit comprising:

means for detecting an actual running resistance of a vehicle; and means for controlling and generating an assist drive force corresponding to the actual running resistance of said vehicle;

means for setting a predetermined running resistance of an ordinary bicycle;

means for determining the assist drive force generated by said motor drive system in accordance with a difference between the actual running resistance and ordinary bicycle's running resistance; and means for determining an inclination of a road surface on the basis of the actual running resistance; wherein the motor drive force is increased when the road surface is a flat road or an upward slope; and the increasing operation of the motor drive force is performed by reducing the ordinary bicycle's running resistance, wherein the assist drive force is decreased for a predetermined period of time if the inclination of the running road surface is changed into an upward inclination, and the drive force is increased for a predetermined period of time if the inclination of the running road surface is changed into a downward inclination.

8. A control unit for a motor-assisted vehicle including a manual powered drive system for transmitting a manual drive force to a rear wheel and a motor drive system for transmitting a motor drive force by a motor to said rear wheel, said control unit comprising:

means for detecting an actual running resistance of a vehicle; and means for controlling and generating an assist drive force corresponding to the actual running resistance of said vehicle;

means for detecting a vehicle speed change amount for a predetermined period of time; and means for detecting a total drive force obtained by adding the assist drive force of said motor to the manual drive force for the predetermined period of time; wherein the actual running resistance is calculated as a function of the vehicle speed change amount to the total drive force.

9. A control unit for a motor-assisted vehicle including a manual powered drive system for transmitting a manual drive force to rear wheel and a motor drive system for transmitting a motor drive force by a motor to said rear wheel, said control unit comprising:

means for detecting an actual running resistance of a vehicle; and means for controlling and generating an assist drive force corresponding to the actual running resistance of said vehicle, wherein the assist drive force generated by said motor drive system is controlled in such a manner that the actual running resistance of said vehicle substantially corresponds to a flat road running resistance of said vehicle, wherein the assist drive force is decreased for a predetermined period of time if the inclination of the running road surface is changed into an upward inclination, and the motor drive force is increased for a predetermined period of time if the inclination of the running road surface is changed into a downward inclination.

10. A control unit for a motor-assisted vehicle, comprising:

a motor drive system for generating an assist drive force, wherein the assist drive force generated by said motor drive system is decreased for a predetermined period of time if an inclination of a running road surface is changed into an upward inclination, and the drive force generated by said motor drive system is increased for a predetermined period of time if the inclination of the running road surface is changed into a downward inclination.

11. The control unit for a motor-assisted vehicle according to claim 10, wherein said means for determining the road surface inclination compares a ratio of the actual running resistance to a predetermined flat road running resistance, and if said ratio is larger than the predetermined running resistance, the running road surface is determined to be an upward slope and if said ratio is smaller than the predetermined running resistance, the running road surface is determined to be a downward slope.

12. A control unit for a motor-assisted vehicle including a manual powered drive system for transmitting a manual drive force to rear wheel and a motor drive system for transmitting a motor drive force by a motor to said rear wheel, said control unit comprising:

means for detecting an actual running resistance of a vehicle; and means for controlling and generating a first assist drive force corresponding to the actual running resistance of said vehicle; and means for deciding an operational state of said vehicle, wherein the assist drive force is decreased for a predetermined period of time if the inclination of the running road surface is changed into an upward inclination, and the motor drive force is increased for a predetermined period of time if the inclination of the running road surface is changed into a downward inclination.

13. A control unit for a motor-assisted vehicle including a manual powered drive system for transmitting a manual drive force to a rear wheel and a motor drive system for transmitting a motor drive force by a motor to said rear wheel, said control unit comprising:

means for detecting an actual running resistance of a vehicle;

means for controlling and generating a first assist drive force corresponding to the actual running resistance of said vehicle;

means for deciding an operational state of said vehicle; and means for controlling a regeneration instruction, wherein a regeneration instruction is supplied to said motor drive system in accordance with the operational state of said vehicle when the actual running resistance is a negative value.

14. The control unit for a motor-assisted vehicle according to claim 13, further including means for detecting a speed of said vehicle; where said regeneration control means supplies the regeneration instruction in such a manner at a regeneration output is changed in accordance with the vehicle speed.

15. The control unit for a motor-assisted vehicle according to claim 14, further comprising means for detecting a braking operation; wherein said regeneration control means supplies the regeneration instruction in such a manner that the regeneration output is increased in response to a signal indicating detection of the braking operation.

16. The control unit for a motor-assisted vehicle according to claim 14, wherein said regeneration control means prohibits the supply of the regeneration instruction in a predetermined low vehicle speed range equivalent to a vehicle speed at the time when a driver walks said vehicle.

17. The control unit for a motor-assisted vehicle according to claim 13, wherein said regeneration control means supplies the regeneration instruction in such a manner that a change amount of the regeneration output is gradually increased in accordance with the vehicle speed in a predetermined high vehicle speed range.

18. A control unit for a motor-assisted vehicle including a manual powered drive system for transmitting a manual drive force to rear wheel and a motor drive system for transmitting a motor drive force by a motor to said rear wheel, said control unit comprising:

means for detecting an actual running resistance of a vehicle;

means for controlling and generating a first assist drive force corresponding to the actual running resistance of said vehicle;

means for deciding an operational state of said vehicle;

means for generating a second assist drive force for said motor drive system corresponding to a leg-driven manual power and a crank shaft rotational speed; and control means for generating said first drive force and said second drive force selectively or in combination in accordance with the operational state.

19. The control unit for a motor-assisted vehicle according to claim 18, wherein said control means is configured to selectively generate either the first drive force and the second drive force, or only the second drive force, if it is determined by said means for deciding operational state decides that the vehicle is in a state of initial pedaling startup.

20. A control unit for a motor-assisted vehicle including a manual powered drive system for transmitting a manual drive force to a rear wheel and a motor drive system for transmitting a motor drive force by a motor to said rear wheel, said control unit comprising:

means for detecting an actual running resistance of a vehicle;

means for controlling and generating a first assist drive force corresponding to the actual running resistance of said vehicle;

means for deciding an operational state of said vehicle;

means for generating a second assist drive force for said motor drive system corresponding to a leg-driven manual power and a crank shaft rotational speed; and means for deciding an inclination state of a road surface on the basis of the actual running resistance; wherein either the first drive force and the second drive force, or only the second drive force are selectively generated if it is decided that the road surface is a flat road on the basis of the inclination state.

21. A control unit for a motor-assisted vehicle including a manual powered drive system for transmitting a manual drive force to a rear wheel and a motor drive system for transmitting a motor drive force by a motor to aid rear wheel, said control unit comprising:

means for detecting an actual running resistance of a vehicle;

means for controlling and generating an assist drive force corresponding to the actual running resistance of said vehicle so as to maintain a flat road running resistance whether the vehicle is moving on a flat road, upward slope or downward slope;

means for detecting a vehicle speed change amount for a predetermined period of time; and means for detecting a total drive force obtained by adding the assist drive force of said motor to the manual drive force for the predetermined period of time wherein the actual running resistance is calculated as a function of the vehicle speed change amount to the total drive force.

* * * * *